US009515475B2

(12) United States Patent
Kesler et al.

(10) Patent No.: US 9,515,475 B2
(45) Date of Patent: Dec. 6, 2016

(54) ELECTRO-OPTICAL RADIATION COLLECTOR FOR ARC FLASH DETECTION

(71) Applicant: Schweitzer Engineering Laboratories, Inc., Pullman, WA (US)

(72) Inventors: James R. Kesler, Pullman, WA (US); Douglas M. Trout, Lewiston, ID (US); Gary W. Scheer, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 14/456,757

(22) Filed: Aug. 11, 2014

(65) Prior Publication Data
US 2014/0346327 A1 Nov. 27, 2014

Related U.S. Application Data

(63) Continuation of application No. 12/562,202, filed on Sep. 18, 2009, now Pat. No. 8,803,069.
(Continued)

(51) Int. Cl.
*H02H 1/00* (2006.01)
*H01J 3/14* (2006.01)
(52) U.S. Cl.
CPC ............... *H02H 1/0023* (2013.01); *H01J 3/14* (2013.01)
(58) Field of Classification Search
CPC .................. H02H 1/0023; H01J 3/14
(Continued)

(56) References Cited

U.S. PATENT DOCUMENTS 2,612,817 A * 10/1952 Willcox ................ G01J 1/4214
250/216
3,849,786 A 11/1974 Nanba
(Continued)

FOREIGN PATENT DOCUMENTS

EP 249815 12/1987
EP 0818075 1/1998
(Continued)

OTHER PUBLICATIONS

IEEE 1584, Guide for Performing Arc Flash Hazard Calculations, Industry Applications Society, Sep. 23, 2002.
(Continued)

*Primary Examiner* — Renee Chavez
(74) *Attorney, Agent, or Firm* — Joseph J. Hawkins; Richard M. Edge

(57) ABSTRACT

An electro-optical (EO) radiation collector for collecting and/or transmitting EO radiation (which may include EO radiation in the visible wavelengths) for transmission to an EO sensor. The EO radiation collector may be used with an arc flash detection device or other protective system, such as an intelligent electronic device (IED). The arc flash detection device may detect an arc flash event based upon EO radiation collected by and/or transmitted from the EO radiation collector. The EO radiation collector may receive an EO conductor cable, an end of which may be configured to receive EO radiation. A portion of the EO radiation received by the EO radiation collector may be transmitted into the EO conductor cable and transmitted to the arc flash detection device. The EO radiation collector may be adapted to receive a second EO conductor cable, which may be used to provide redundant EO transmission and/or self-test capabilities.

19 Claims, 9 Drawing Sheets

Related U.S. Application Data

(60) Provisional application No. 61/098,637, filed on Sep. 19, 2008.

(58) Field of Classification Search
USPC .... 250/214.1, 221; 340/577, 578; 361/2, 42, 361/115; 385/1, 2, 12, 47, 60, 63, 65, 88–92, 385/115, 116, 120, 121
See application file for complete search history.

(56) References Cited

U.S. PATENT DOCUMENTS

| | | | |
|---|---|---|---|
| 4,285,164 A | 8/1981 | Moore | |
| 4,369,364 A | 1/1983 | Kuntermann | |
| 4,418,338 A | 11/1983 | Burt | |
| 4,422,719 A | 12/1983 | Orcutt | |
| 4,516,022 A | 5/1985 | Lindgren | |
| 4,614,868 A | 9/1986 | Alster | |
| 4,702,553 A | 10/1987 | Buchmuller | |
| 4,791,518 A | 12/1988 | Fischer | |
| 4,878,144 A | 10/1989 | Nebon | |
| 4,978,863 A | 12/1990 | Lyons | |
| 5,170,050 A | 12/1992 | Giboulet | |
| 5,208,542 A | 5/1993 | Tennies | |
| 5,245,200 A * | 9/1993 | Fladda | G01N 15/06 250/227.25 |
| 5,682,101 A | 10/1997 | Brooks | |
| 5,771,091 A | 6/1998 | Paritsky | |
| 5,940,547 A | 8/1999 | Schumacher | |
| 6,011,480 A | 1/2000 | Schweitzer | |
| 6,124,706 A | 9/2000 | Woods | |
| 6,229,680 B1 | 5/2001 | Shea | |
| 6,292,105 B1 | 9/2001 | Land | |
| 6,433,976 B1 | 8/2002 | Phillips | |
| 6,476,396 B1 | 11/2002 | Forsyth | |
| 6,693,438 B2 | 2/2004 | Shea | |
| 6,920,028 B2 | 7/2005 | Schweitzer | |
| 7,035,068 B2 | 4/2006 | Shea | |
| 7,397,596 B2 | 7/2008 | Yacoubian | |
| 7,526,393 B2 | 4/2009 | Thurmond | |
| 7,536,914 B2 | 5/2009 | Land | |
| 7,580,232 B2 | 8/2009 | Caggiano | |
| 7,750,646 B2 | 7/2010 | Maity | |
| 7,791,846 B2 | 9/2010 | Roscoe | |
| 7,952,360 B2 | 5/2011 | Ganesh | |
| 8,154,730 B2 | 4/2012 | Wu | |
| 8,319,173 B2 | 11/2012 | Schweitzer, III | |
| 8,451,572 B2 | 5/2013 | Schweitzer, III | |
| 8,593,769 B2 | 11/2013 | Schweitzer, III | |
| 8,664,961 B2 | 3/2014 | Zeller | |
| 8,675,329 B2 | 3/2014 | Schweitzer, III | |
| 8,735,798 B2 | 5/2014 | Kesler | |
| 8,803,069 B2 | 8/2014 | Kesler | |
| 2003/0205460 A1 | 11/2003 | Buda | |
| 2004/0054921 A1 | 3/2004 | Land | |
| 2004/0125532 A1 | 7/2004 | Schweitzer | |
| 2005/0203672 A1 | 9/2005 | Restrepo | |
| 2006/0261259 A1 | 11/2006 | Beinhocker | |
| 2007/0014060 A1 | 1/2007 | Land | |
| 2007/0070568 A1 | 3/2007 | Potter | |
| 2007/0108986 A1 | 5/2007 | Moore | |
| 2007/0132458 A1 | 6/2007 | Allen, Jr. | |
| 2007/0242402 A1 | 10/2007 | Papallo | |
| 2008/0004853 A1 | 1/2008 | Radibratovic | |
| 2008/0094612 A1 | 4/2008 | Land | |
| 2008/0170344 A1 | 7/2008 | Byron | |
| 2008/0239592 A1 | 10/2008 | Roscoe | |
| 2009/0161272 A1 | 6/2009 | Asokan | |
| 2009/0189615 A1 | 7/2009 | Kinsel | |
| 2010/0026425 A1 | 2/2010 | Roscoe | |
| 2012/0002195 A1 | 1/2012 | Wu | |
| 2012/0312977 A1 | 12/2012 | Schweitzer, III | |

FOREIGN PATENT DOCUMENTS

| | | |
|---|---|---|
| EP | 1646119 | 4/2006 |
| WO | 8808217 | 10/1998 |
| WO | 0221657 | 3/2002 |

OTHER PUBLICATIONS

IEEE 1584a, IEEE Guide for Performing Arc-Flash Hazard Calculations—Amendment 1, IEEE Industry Applications Society, Nov. 29, 2004.

PCT/US2009/057531 Patent Cooperation Treaty, International Search Report and Written Opinion of the International Searching Authority, Nov. 19, 2009.

VAMP Arc Protection Series, VAMP 121, VAMP 221, Jun. 24, 2008.

UTU Arc Protection Systems—a possibility to be protected, Feb. 27, 2002.

George Roscoe, Marcelo E. Valdes, Ray Luna, Methdos for Arc-Flash Detection in Electrical Equipment, Petroleum and Chemical Industry Conference, 2010 Record of Conference Papers Industry Applications Society, Sep. 20-22, 2010.

PCT/US2009/057520 Patent Cooperation Treaty, International Search Report and Written Opinion of the International Searching Authority, Nov. 6, 2009.

PCT/US2009/057536 Patent Cooperation Treaty, International Search Report and Written Opinion of the International Searching Authority, Nov. 19, 2009.

PCT/US2009/057541 Patent Cooperation Treaty, International Search Report and Written Opinion of the International Searching Authority, Nov. 10, 2009.

PCT/US2009/057548 Patent Cooperation Treaty, International Search Report and Written Opinion of the International Searching Authority, Dec. 3, 2009.

Kevin Lippert, Donald M. Colaberardino, Clive W. Kimblin, Understanding IEEE 1584 Arc Flash Calculations, IEEE Industry Applications Magazine, May 2005.

ABB, Arc Protection Relay, Product Guide REA 10_, Jun. 22, 2005.

ABB, Arc Protection System REA, Jun. 2005.

Robert Wilson, Rainer Harju, Juha Keisala, Sethuraman Ganesan, Tripping with the Speed of Light: Arc Flash Protection, Mar. 27, 2007.

Meyle, LBW21 Arc Detection System Operating Instruction, Dec. 2004.

European Search Report, Aug. 5, 2013 for European Patent Application 09815287.9.

European Search Report, Aug. 5, 2013 for European Patent Application 09815298.6.

European Search Report, Jul. 2, 2013 for European Patent Application 09815295.2.

\* cited by examiner

ELECTRO-OPTICAL RADIATION COLLECTOR FOR ARC FLASH DETECTION

CROSS-REFERENCE TO RELATED APPLICATIONS

This application claims priority to U.S. patent application Ser. No. 12/562,202, entitled "Electro-Optical Radiation Collector for Arc Flash Detection," which was filed on Sep. 18, 2009, and which claims the benefit under 35 U.S.C §119(e) of U.S. Provisional Patent Application Ser. No. 61/098,637, entitled "Optic Sensor for Arc Flash Detection," which was filed Sep. 19, 2008, each of which is hereby incorporated by reference in its entirety.

TECHNICAL FIELD

This disclosure relates to electro-optical radiation collection and/or sensing devices and, in particular, to a versatile electro-optical radiation collector that may be used for arc flash detection.

BRIEF DESCRIPTION OF THE DRAWINGS

The accompanying drawings illustrate various exemplary embodiments of the present system and method and are a part of the specification. Together with the following description, the drawings demonstrate and explain the principles of the present system and method. The illustrated embodiments are examples of the present system and method and do not limit the scope thereof.

DETAILED DESCRIPTION

Figure 1A:
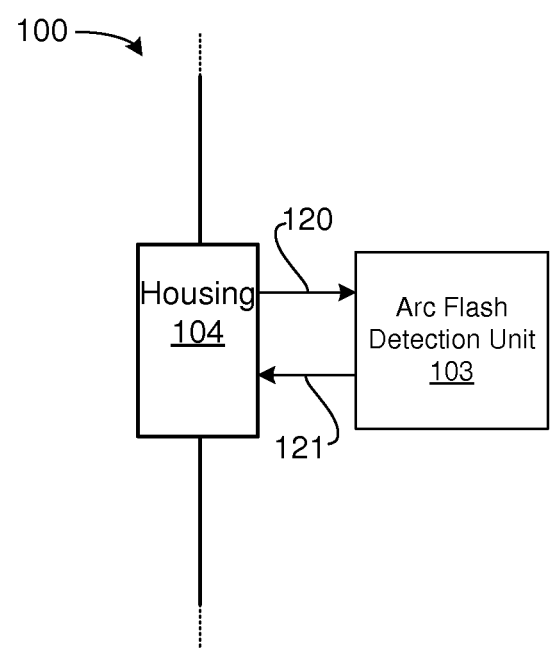
FIG. 1A is a block diagram of one embodiment of a system for providing arc flash protection to a power system.

Arc flashes pose a serious risk to both personnel and equipment in the vicinity of a flash. An arc flash may produce intense electro-optical (EO) radiation (including visible light) in the area of the arc. In addition, an overcurrent condition may be created on electric conductor(s) that feed the arc.

An arc flash detection unit (AFDU) may be configured to monitor a portion of a power system (e.g., an enclosure, housing, or the like). The AFDU may be configured to detect an arc flash event based on stimulus received from the power system. The AFDU may make use of various different types of stimulus including, but not limited to: EO radiation detected in the vicinity of the power system, current levels within the power system, voltage levels at various points within the power system, heat, chemical detection, pressure differentials (e.g., sound), detection of particulates within an enclosure, or the like.

The time required to detect an arc flash event by a protection system (e.g., an AFDU) may be used to determine a total time required to clear the arc flash (e.g., the total time required to clear the arc flash may be a sum of the time required to detect the flash plus the time required to trip protective elements responsive to the detection). The time required to clear the arc flash may be referred to as a "total arcing time," which may be used to calculate the incident energy released by the arc flash event (given the arc current, resistance, conductor gap, and the like). The detection time of an arc flash protection system may vary depending upon the configuration of the protection system (e.g., the sensitivity of the system). System sensitivity may be selected to provide a balance between providing adequate arc flash protection and preventing misoperation (e.g., detecting false positives).

The "Guide for Performing Arc Flash Hazard Calculations," which is promulgated by the Institute of Electrical and Electronics Engineers (IEEE) as IEEE 1584, provides several means for calculating arc flash incident energy, one of which is provided below in Equation 1:

$$\text{Log}(E_N) = K_1 + K_2 + 1.0811 \cdot \text{Log}(I_a) + 0.0011 \cdot G \qquad \text{Eq. 1}$$

In Equation 1, $E_N$ is the arc flash incident energy, $K_1$ is a switchgear-dependent constant value (depending upon whether the switchgear is in an open or box configuration), $K_2$ is a constant (0 for ungrounded or high-resistance grounded switchgear and $-0.113$ for grounded systems), $I_a$ is the maximum arcing current, and G is a gap between conductors within the switchgear.

The IEEE 1584 standard further provides means for determining an arc-protection boundary as follows:

$$D_b = \left[ 4.184 \cdot C_f \cdot E_n \cdot \left( \frac{t}{0.2} \right) \cdot \left( \frac{610^x}{E_b} \right) \right]^{\frac{1}{x}} \qquad \text{Eq. 2}$$

In Equation 2, $D_b$ is the distance of the boundary from the arcing point, $C_f$ is a voltage constant (1.0 for voltages above 1 kV), $E_n$ is the normalized arc flash incident energy (e.g., calculated per Equation 1 above), $E_b$ is the incident energy at the boundary (5.0 J/cm² for bare skin), and x is a distance exponent constant (0.973 for 5 kV switchgear).

The protection boundary may determine where maintenance personnel may safely work in relation to the switchgear and/or may determine what, if any, protective gear should be used by the personnel.

Other standards exist for calculating arc flash energy to determine appropriate proximity and/or protective gear requirements. For instance, the National Fire Protection Association (NFPA) provides for the calculation of an arc thermal performance value (ATPV), which is similar to the IEEE 1584 arc flash incident energy. The ATPV may determine a proximity boundary in which maintenance personnel may safely work. In addition, the ATPV and proximity boundary may indicate the nature of the protective gear that should be used by personnel. Other arc flash safety-related standards are provided by the National Electric Code (NEC) and Occupational Safety and Health Administration (OSHA).

As used herein, the "electro-optical" (abbreviated herein as EO) may refer to electromagnetic and/or optical radiation. EO radiation may include various frequencies and/or wavelengths of electromagnetic and/or optical radiation, some of which may be emitted during an arc flash event. EO radiation may include visible light as well as other wavelengths including, but not limited to: radio, microwave, infrared (IR), ultraviolet (UV), X-ray, and the like. The EO radiation collectors disclosed herein may be configured to transmit any single frequency, multiple frequencies, or a predetermined range of frequencies of EO radiation. In some embodiments, EO radiation collectors are tuned or filtered to gather or transmit only certain frequencies or frequency ranges.

FIG. 1A shows one embodiment of an AFDU 103 in an electrical power system 100. The AFDU 103 may be communicatively coupled to portions of the power system 100 to receive stimulus 120 therefrom. As will be discussed below, the AFDU 103 may be configured to detect an arc flash event occurring within the power system 100 (e.g., within a housing 104) based on the stimulus 120 received from the power system 100 (e.g., current measurements, EO radiation measurements, etc.).

In some embodiments, the AFDU 103 may be communicatively coupled to one or more current transformers, or other measurement devices, configured to provide the AFDU 103 with stimulus 120 comprising current measurements from various points within the power system 100 (e.g., on either side of a housing 104 in the electrical power system 100). The housing 104 may include components that may be susceptible to arc flash events (e.g., switchgear, circuit breakers, and the like).

The AFDU 103 may be configured to receive other types of stimulus 120, such as measurements of EO radiation detected by one or more EO radiation collectors disposed within the vicinity of the power system 100. The EO radiation collectors may be disposed within the housing 104 and/or may be positioned to capture EO radiation produced by an arc flash event. In some embodiments, the EO radiation collectors may be positioned within a switchgear enclosure 105 within the housing 104.

Although particular types of stimulus 120 are discussed herein (e.g., current and EO stimulus), the AFDU 103 could be configured to detect an arc flash event based on any number of different types of stimulus 120. Therefore, this disclosure should not be read as limited in this regard.

The AFDU 103 may be configured to invoke certain protective functions upon detecting an arc flash event. The protective function may be invoked via a communications interface 121 with the power system 100 (e.g., with power system components within the housing 104). For example, the AFDU 103 may trigger a circuit breaker, a switch, or other equipment to remove an arcing circuit from power and/or isolate the circuit from the rest of the power system 100. Alternatively, or in addition, the AFDU 103 may produce an alarm signal that may be received by another protective system (e.g., a protective relay, an IED, or the like), which may be configured to take one or more protective actions responsive to the alarm. The alarm may be transmitted to other remote devices and/or may be made available for display on a human-machine interface (HMI). These protective actions may reduce the amount of energy released by the arc flash event and/or may alert other systems and/or personnel to the arc flash event.

Figure 1B:
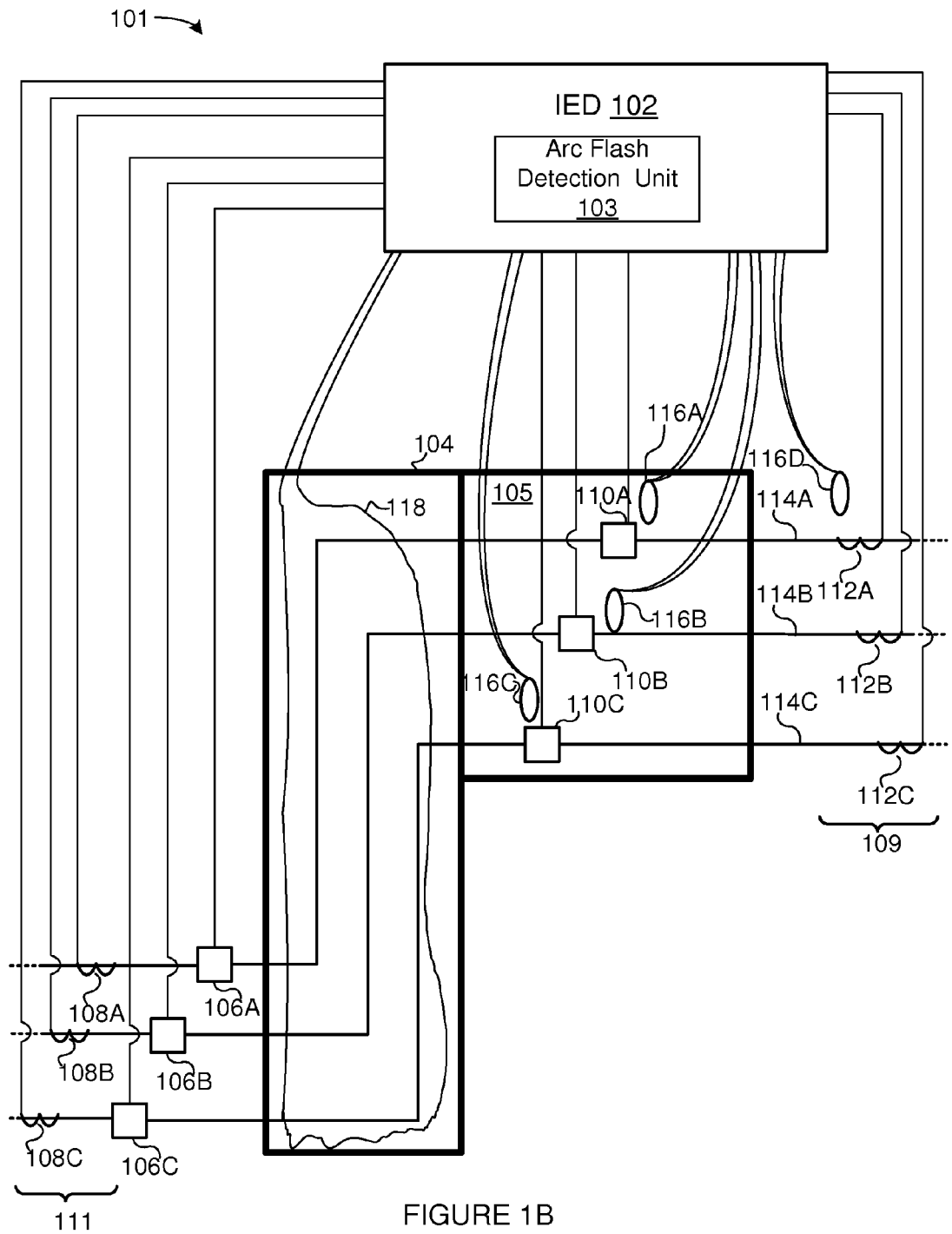
FIG. 1B is a block diagram of another embodiment of a system for providing arc flash protection to a power system.

FIG. 1B shows an electrical power system 101 that includes an intelligent electronic device (IED) 102 comprising an AFDU 103. The IED 102 may provide various monitoring and protection services to the power system 101, including electrical power system components within a housing 104.

As used herein, an IED (such as the IED 102 of FIG. 1) may refer to any one or combination of: a CPU-based relay and/or protective relay, a digital fault recorder, a phasor measurement unit (PMU), a phasor measurement and control unit (PMCU), a phasor data concentrator (PDC), a wide area control system (WACS), a relay with phasor measurement capabilities, a wide area protection system (WAPS), a Supervisory Control and Data Acquisition (SCADA) system, a Programmable Automation Controller (PAC), a Programmable Logic Controller (PLC), a dedicated arc flash protection controller (e.g., an AFDU), a system integrity protection scheme, or any other device capable of monitoring and/or protecting an electrical power system. Accordingly, the IED 102 may comprise one or more processors, memories, computer-readable storage media, communications interfaces, HMI components, and the like. In the FIG. 1B embodiment, the IED 102 may be a protective relay, such as the SEL 751 manufactured by and available from Schweitzer Engineering Laboratories, Inc. of Pullman, Wash.

As shown in FIG. 1B, the AFDU 103 may be implemented within the IED 102 (e.g., as a component of the IED 102). The AFDU 103 may be implemented as machine-readable and/or machine-interpretable instructions stored on a computer-readable storage media of the IED 102. Alternatively, or in addition, the AFDU 103 may comprise one or more hardware components. In some embodiments, the AFDU 103 (or portions thereof) may be implemented independently of an IED 102 (e.g., the AFDU 103 may comprise its own independent processing resources, communications interfaces, etc.).

The IED 102 and/or AFDU 103 may be configured to monitor power system equipment disposed within the housing 104. The housing 104 may comprise a switchgear cabinet, a sealed enclosure, or any other housing type. The housing 104 may enclose switchgear equipment, such as circuit breakers 110A, 110B, and/or 110C, and the like.

The AFDU 103 may receive various types of stimulus 120 from the power system 101. The stimulus 120 may be received directly (e.g., by sensors coupled to the AFDU 103) and/or indirectly through another device, such as the IED 102. In the FIG. 1B example, the AFDU 103 is configured to receive current stimulus (current measurements obtained by current transformers) and EO stimulus (EO radiation collected by EO radiation collectors). The AFDU 103 may be configured to detect an arc flash event based on the current and EO stimulus 120. However, in alternative embodiments, the AFDU 103 may be configured to detect arc flash events using other stimulus types (e.g., EO radiation and/or current measurements alone, heat, pressure, chemical emissions, etc.).

The AFDU 103 may be configured to monitor a three-phase power signal comprising three conductors 114A, 114B, and 114C, each of which may run through the housing 104 (one for each phase of the three-phase power signal). For instance, the conductor 114A may carry an "A phase" electrical power signal, the conductor 114B may carry a "B phase" electrical power signal, and the conductor 114C may carry a "C phase" electrical power signal. Although a three-phase power signal is referred to herein, one skilled in the art will recognize that the teachings of this disclosure could be applied to power systems comprising any type and/or number of power signals, and, as such, the teachings of the disclosure should not be read as limited in this regard.

In the FIG. 1B example, the AFDU 103 receives current measurements from current transformers (CTs) communicatively and/or electrically coupled to the conductors 114A, 114B, and/or 114C; CTs 112A, 112B, and 112C are coupled to the conductors 114A, 114B, and 114C at a first location 109, and CTs 108A, 108B, and 108C are coupled to the conductors 114A, 114B, and 114C at a second location 111 (e.g., on an opposite end of the housing 104).

The AFDU 103 is communicatively coupled to EO radiation collectors 116A, 116B, 116C, 116D, and 118, which may be configured to detect EO radiation emitted within the vicinity of the housing 104. As used herein, an EO radiation collector, such as the point EO radiation collectors 116A, 116B, 116C, 116D, and/or the loop EO radiation collector 118, may be configured to capture various types of EO radiation, including visible EO radiation (e.g., visible light), infra-red (IR) radiation, ultra-violet (UV) radiation, and/or EO radiation at other wavelengths. Moreover, as used herein, light or a "light event" may refer to EO radiation that comprises EO energy at many different wavelengths, some of which may be visible to the human eye and some of which may not. Therefore, this disclosure should not be read as limited to detection and/or processing of only EO radiation visible to humans, but should be read as encompassing any type of EO radiation known in the art.

The EO radiation collectors 116A, 116B, 116C, 116D and 118 may be distributed within the housing 104 and may be communicatively and/or electro-optically coupled to the IED 102 and/or AFDU 103. In some embodiments, the EO radiation collectors 116A, 116B, 116C and/or 116D may be EO radiation "point collectors," comprising fiber-optic leads (or other EO conductive material) configured to selectively detect EO radiation within the housing 104 (e.g., detect EO radiation at particular points and/or locations within the housing 104). The point EO radiation collectors 116A, 116B, 116C, and/or 116D may be placed and/or positioned within the housing 104 so as to be capable of collecting EO radiation produced by an arc flash event therein (e.g., in the vicinity of the switchgear components, such as the circuit breakers 110A, 110B, and/or 110C, a breaker trunk compartment (not shown), or the like). For example, the point EO radiation collectors 116A, 116B, 116C, and/or 116D may be positioned to have a line-of-sight and/or an electro-optical path to respective breakers 110A, 110B, and/or 110C (e.g., to avoid "shadows" or other obscuring structures within the housing 104). In some embodiments, the point EO radiation collectors 116A, 116B, 116C, and/or 116D may be optically coupled to additional optical elements (not shown), such as mirrors, fiber-optic leads, lenses, EO conductive materials, or the like, which may be configured to direct EO radiation produced within the housing 104 and/or in the vicinity of the switchgear components (e.g., breakers 110A, 110B, and/or 110C) to one or more of the point EO radiation collectors 116A, 116B, 116C and/or 116D.

The EO radiation collectors 116A, 116B, 116C, and/or 116D may comprise EO conductive materials, such as fiber-optic filaments, capable of collecting EO radiation and transmitting a portion thereof to the IED 102 and/or AFDU 103. Alternatively, or in addition, the EO radiation collectors 116A, 116B, 116C, and/or 116D may be capable of collecting EO radiation and transmitting an electrical signal and/or other indicator of the detected EO radiation to the IED 102 and/or AFDU 103 (e.g., via a communication network or the like).

The AFDU 103 may be coupled to other devices capable of collecting EO radiation, such as the loop EO radiation collector 118, which may extend through a portion of the housing 104. The loop EO radiation collector 118 may comprise one or more sheathed fiber-optic cables (or other EO conductive material), wherein portions of the cable are exposed (e.g., portions of sheathing around the EO conductive material are removed). The loop EO radiation collector 118 may be configured to receive EO radiation through these exposed portions. The EO radiation so received may be transmitted to the IED 102 and/or AFDU 103. Alternatively, or in addition, the loop EO radiation collector 118 may comprise a dedicated EO sensor (not shown), which may transmit an electrical signal or other indicator of the EO radiation detected thereby (e.g., via a communication network or the like).

Although FIG. 1B depicts the AFDU 103 receiving EO stimulus from a particular set of EO radiation collectors 116A, 116B, 116C, 116D, and 118, one skilled in the art will recognize that the teachings of this disclosure could be applied to any number and/or type of EO radiation collectors, including, but not limited to: optical lenses, waveguides, concentrators, and the like. Therefore, this disclosure should not be read as limited to any particular number, type, and/or arrangement of EO radiation collectors. Moreover, although a particular housing 104 is depicted, the disclosure is not limited in this regard; the teachings of this disclosure could be applied to any housing known in the art including, but not limited to: a breaker box, switch box, busbar enclosure, duct, conduit, or other enclosure or housing type.

The AFDU 103 may be configured to detect an arc flash event based on inter alia stimulus received from the CTs 108A, 108B, 108C, 112A, 112B, and 112C and/or EO radiation collectors 116A, 116B, 116C, 116D, and 118. High levels of EO radiation and/or high current levels may be indicative of an arc flash event occurring within the housing 104. Responsive to the AFDU 103 detecting an arc flash event, the IED 102 may be configured to take one or more protective actions, such as tripping one or more circuit breakers (e.g., breakers 106A, 106B, and/or 106C), removing one or more of the conductors 114A, 114B, and/or 114C from power, transmitting one or more alarm signals to external devices, displaying an alarm on an HMI, or the like.

For example, the IED 102 may be communicatively coupled to the circuit breakers 106A, 106B, 106C via a communication network (e.g., over an Ethernet network, a SCADA network, an IEEE C37.118 network, a wireless network, or the like). Responsive to the AFDU 103 detecting an arc flash event on one or more of the conductors 114A, 114B, and/or 114C, the IED 102 may be configured to interrupt the power flow thereon.

Figure 2:
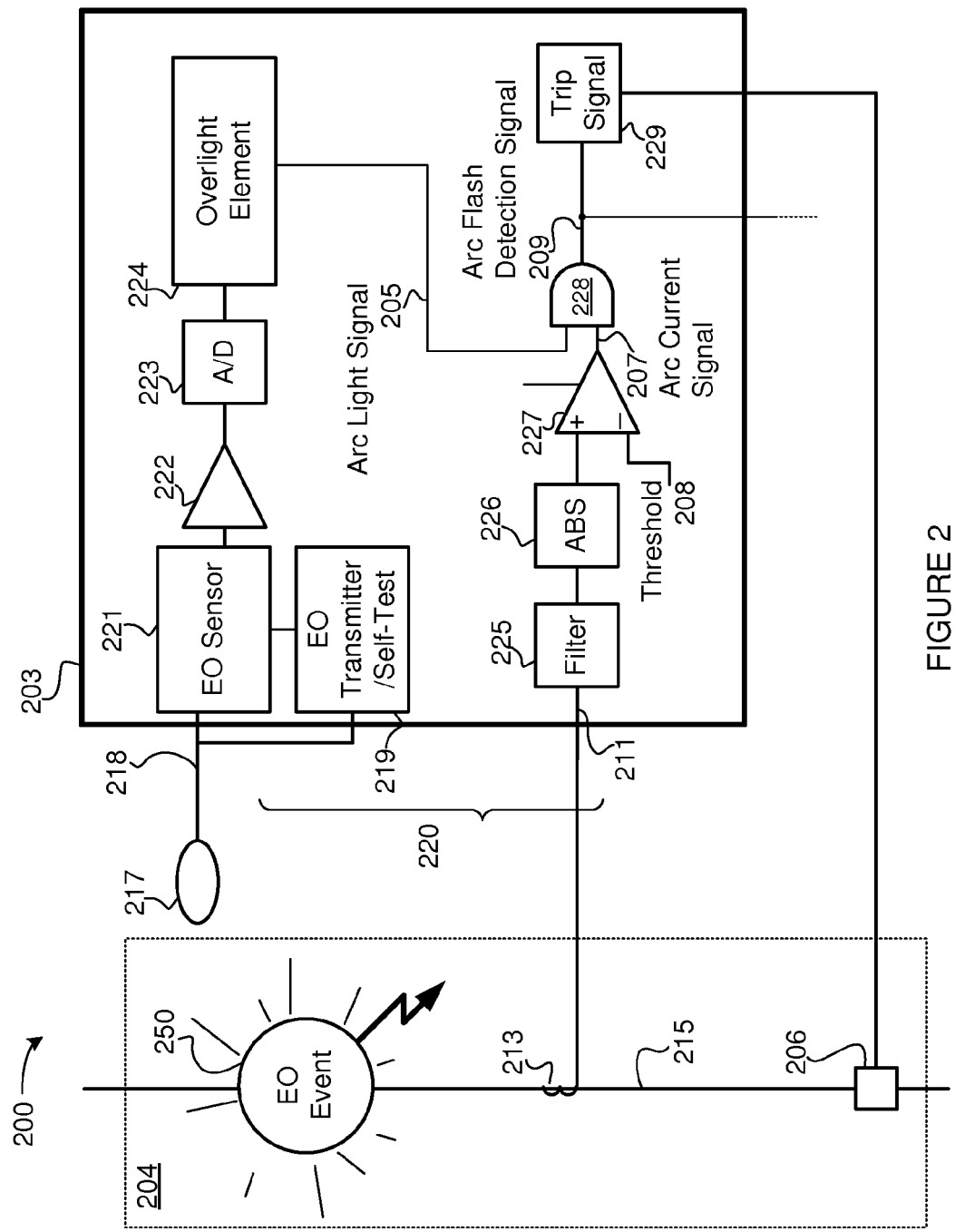
FIG. 2 is a block diagram of an arc flash protection device.

FIG. 2 is one embodiment of an arc flash detection unit (AFDU), such as the AFDU 103 and/or IED 102 of FIGS. 1A and 1B. An electrical power system 200 may be protected by an AFDU 203, which, as discussed above, may be implemented independently and/or in conjunction with an IED (not shown); the AFDU 203 may be part of an IED, such as IED 102 depicted in FIG. 1, and/or may be an independent device (e.g., add-on device), which may be communicatively coupled to an IED.

In the FIG. 2 embodiment, the AFDU 203 may monitor a portion of an electrical power system 200, which may comprise a conductor 215 and a circuit breaker 206. The AFDU 203 may receive various types of stimulus 220 from the electrical power system 200. In the FIG. 2 example, the AFDU 203 receives current and EO radiation stimulus 220 via respective measurement devices 213 and 217. A CT 213 may be coupled to the conductor 215 to measure a current flowing thereon. The CT 213 may be communicatively coupled to an input 211 of the AFDU 203 to provide current measurement stimulus thereto. An EO radiation collector 217 may be placed in proximity to the conductor 215 and/or within a housing 204 through which the conductor 215 passes. The EO radiation collector 217 may comprise a point-source EO radiation collector, a loop EO radiation collector, or any other device capable of collecting and/or transmitting EO radiation.

An arc flash event occurring in the vicinity of the conductor 215 (e.g., between the conductor 215 and ground, another conductor, a switch (not shown), on a circuit breaker (not shown), or the like), may produce an EO event 250. The EO event 250 caused by the arc flash may cause EO radiation to be emitted, which may be collected and/or transmitted by the EO radiation collector 217. As discussed above, the EO event 250 may produce EO radiation at various frequencies and/or wavelengths, some of which may be visible to a human. The EO radiation collector 217 may be electro-optically coupled to the AFDU 203 to transmit a portion of the EO radiation emitted by the EO event 250 and detected by the EO radiation collector 217 to the EO sensor 221 of the AFDU 203.

The EO sensor 221 may be configured to convert EO radiation received from the radiation collector 217 into a signal indicative of the EO radiation (e.g., an electrical signal). Accordingly, the EO sensor 221 may comprise a photodiode (such as a silicon photodiode), a photo resistor, Charge-Coupled Device (CCD) detector, an IR detector, a complementary metal-oxide-semiconductor (CMOS) device, or any other device or structure capable of converting EO radiation into an electrical signal.

In some embodiments, the signal produced by the EO sensor 221 may be amplified by an amplifier 222 and sampled (e.g., converted into a discrete, digital value) by an A/D converter 223. The amplifier 222 may comprise a fixed or variable gain amplifier. In alternative embodiments, the amplifier 222 may be omitted. In embodiments implemented using analog circuitry, the A/D converter 223 may be omitted.

Although FIG. 2 shows the EO sensor 221, amplifier 222, and A/D converter 223 as part of the AFDU 203, one skilled in the art will recognize that these components could be disposed in proximity to the EO radiation collector 217. In this alternative embodiment, the EO radiation collector 217 may be configured to generate a signal indicative of detected EO radiation (e.g., as a sampled, discrete measurement) using a local EO sensor, amplifier, and/or A/D converter (not shown), and could communicate the measurement(s) to the AFDU 203 via a communication network (not shown) or the like.

The AFDU 203 includes an overlight element 224, which may produce an arc light signal 205 based on the EO measurements received via the EO sensor 221. Assertion of the arc light signal 205 may indicate that the AFDU 203 has detected EO radiation indicative of an arc flash event.

In some embodiments, the overlight element 224 may compare the sampled, discrete EO radiation measurements produced by the A/D converter 223 to an overlight threshold value. The overlight threshold value may represent an EO radiation level that is indicative of an arc flash event (e.g., as opposed to changes in ambient light conditions or the like). The arc light signal 205 may be asserted if the EO radiation level exceeds the threshold. The threshold may be adapted according to a desired sensitivity level of the AFDU 203.

The overlight element 224 may implement other comparison techniques. For example, the overlight element 224 may implement an inverse time comparison (inverse time over EO radiation intensity plot), which may cause the arc light signal 205 to assert if the intensity of the EO radiation is maintained above a threshold for a time determined by an inverse time over-EO radiation plot. The time threshold may be based upon the intensity of the EO radiation; as the intensity of the EO radiation increases, the time required to maintain the EO intensity at the particular level decreases. Alternatively, or in addition, the overlight element 224 may comprise an integrator, which may assert the arc light signal 205 if a particular cumulative intensity is achieved within a predetermined time period (e.g., within a sliding window). Although various comparison techniques are described herein, the overlight element 224 is not limited in this regard and could employ and/or incorporate any comparison method and/or technique known in the art.

Assertion of the arc light signal 205 may be indicative of an arc flash event. Therefore, in some embodiments, the arc light signal 205 may be transmitted to an IED (not shown), may cause one or more protective actions to take place, such as removing the conductor 215 from the power system (e.g., tripping the circuit breaker 206), and/or may be provided as an output of the AFDU 203 (not shown).

In some embodiments, the AFDU 203 may be configured to detect an arc flash event based upon EO and overcurrent stimulus. Accordingly, the arc light signal 205 may flow to an AND gate 228, which may combine the arc light signal 205 with an arc current signal 207. The arc current signal 207 may be asserted upon detection of an overcurrent condition (discussed below).

A current input 211 of the AFDU 203 may be configured to receive current measurements acquired by a CT 213 communicatively and/or electrically coupled to the conductor 215. A filter 225 may filter the current measurements (e.g., using a low-pass filter, a band-pass filter, an anti-alias filter, a combination of filters, or the like). The magnitude of the current measurements may be calculated by an absolute value block 226 and/or sampled (e.g., using an A/D converter (not shown)).

A comparator 227 may use the received current measurements to assert an arc current signal 207. The comparator 227 may implement any comparison technique known in the art. In some embodiments, the comparator 227 may compare the current measurements to a threshold 208. The threshold 208 may be an overcurrent threshold indicative of current levels produced during an arc flash event. Therefore, the arc current signal 207 may be asserted if the current measurements exceed the threshold 208. The threshold 208 may be configurable to allow the sensitivity of the AFDU 203 to be adjusted.

The AFDU 203 may include other overcurrent comparison mechanisms and/or techniques. For example, the AFDU 203 may implement an inverse time-over-current comparison, which, as discussed above, may assert the arc current signal 207 if the current measurements exceed a threshold (threshold 208) for a particular time period. The time period may be inversely proportional to the intensity of the current stimulus measurements.

The arc light signal 205 and the arc current signal 207 flow to the AND gate 228, the output of which may comprise an arc flash detection signal 209. In some embodiments, the AFDU 203 may further include a security timer (not shown). The security timer may supervise the arc flash detection signal 209, such that the arc flash detection signal 209 is asserted only if the output of the AND gate 228 is asserted for a pre-determined time period and/or for a pre-determined number of measurement cycles.

The arc flash detection signal 209 may be used to activate one or more protective modules (e.g., protective modules and/or functions of an IED (now shown)) upon which the AFDU 203 is implemented). FIG. 2 shows the arc flash detection signal 209 activating a trip signal module 229. The trip signal module 229 may comprise a protective function of a protective device, such as an IED. Assertion of the arc flash detection signal 209 may cause the trip signal module 229 to generate a trip signal to the circuit breaker 206. As discussed above, the arc flash detection signal 209 may be communicated to an IED or other device configured to monitor and/or protect the power system 200. Responsive to assertion of the signal 209, the IED may take one or more protective actions as described above. The circuit breaker 206 may remove the conductor 215 from power, which may clear the arc flash event and minimize the energy released thereby. The AFDU 203 (alone or in conjunction with another device, such as an IED) may be configured to provide other arc flash event monitoring and/or protection mechanisms including, but not limited to: transmitting the arc flash detection signal 209 to an HMI, IED, or other device; tripping additional circuit breakers; diverting power to or from portions of a power system; and the like. In some embodiments, the trip signal generator 229 may be configured to transmit the arc flash detection signal in a particular format and/or using a particular protocol, including, but not limited to: Ethernet, SCADA, IEEE C37.118, SNMP, or the like. As will be appreciated by one of skill in the art, any signaling and/or control mechanism could be used under the teachings of this disclosure.

In some embodiments, the AFDU 203 may be configured to assert the arc flash detection signal 209 based upon the arc light signal 205 alone (e.g., the arc light signal 205 may flow directly to the trip signal input 209, bypassing the AND gate 228). Accordingly, the current input 211, filter 225, absolute value block 226, comparator 227 and/or AND gate 228 may be omitted from the AFDU 203.

The EO radiation collector 217, the EO sensor 221, and/or the EO transmitter/self-test module 219 may be used in connection with any type of arc flash detection unit configured to detect an arc flash event using various different stimulus types (e.g., voltage signals, temperature measurements, chemical readings, pressure measurements, etc.). Therefore, this disclosure should not be read as limited to any particular arc flash detection mechanism and/or technique.

As shown in FIG. 2, the EO radiation collector 217 may be electro-optically coupled to the AFDU 203 by an EO conductor cable 218, which, in some embodiments, may comprise a fiber optic cable. The operation and/or configuration of the EO conductor cable 218 and/or the EO radiation collector 217 may be validated by a self-test operation provided by inter alia an EO transmitter/self-test module 219. In some embodiments, the EO conductor cable 218 may include a plurality of EO conductor cables, including a first conductor and a second conductor. The EO conductor cables 218 may be coupled to the EO radiation collector 217 such that there is an optical path therebetween. A first one of the conductors 218 may be coupled to the EO sensor 221, and a second one of the conductors 218 may be coupled to an EO transmitter/self-test module 219. The EO transmitter/self-test module 219 may be configured to periodically provide test pulses to the EO radiation collector 217 (via the second conductor), which may be transmitted to the EO sensor 221 via the conductor 218 (e.g., the first one of the conductors 218). The EO transmitter/self-test module 219 may be communicatively coupled to the EO sensor 221 to detect an EO signal responsive to the emitted EO radiation. If an EO signal responsive to the emitting is detected, the EO radiation collector 217 (and EO conductor cable 218) may be validated; otherwise, a self-test fail may be detected. Responsive to detection of a self-test failure, the EO transmitter/self-test module 219 may cause one or more alarms to be asserted, issue one or more alerts, trip one or more breakers, and/or take other actions.

Figure 3:
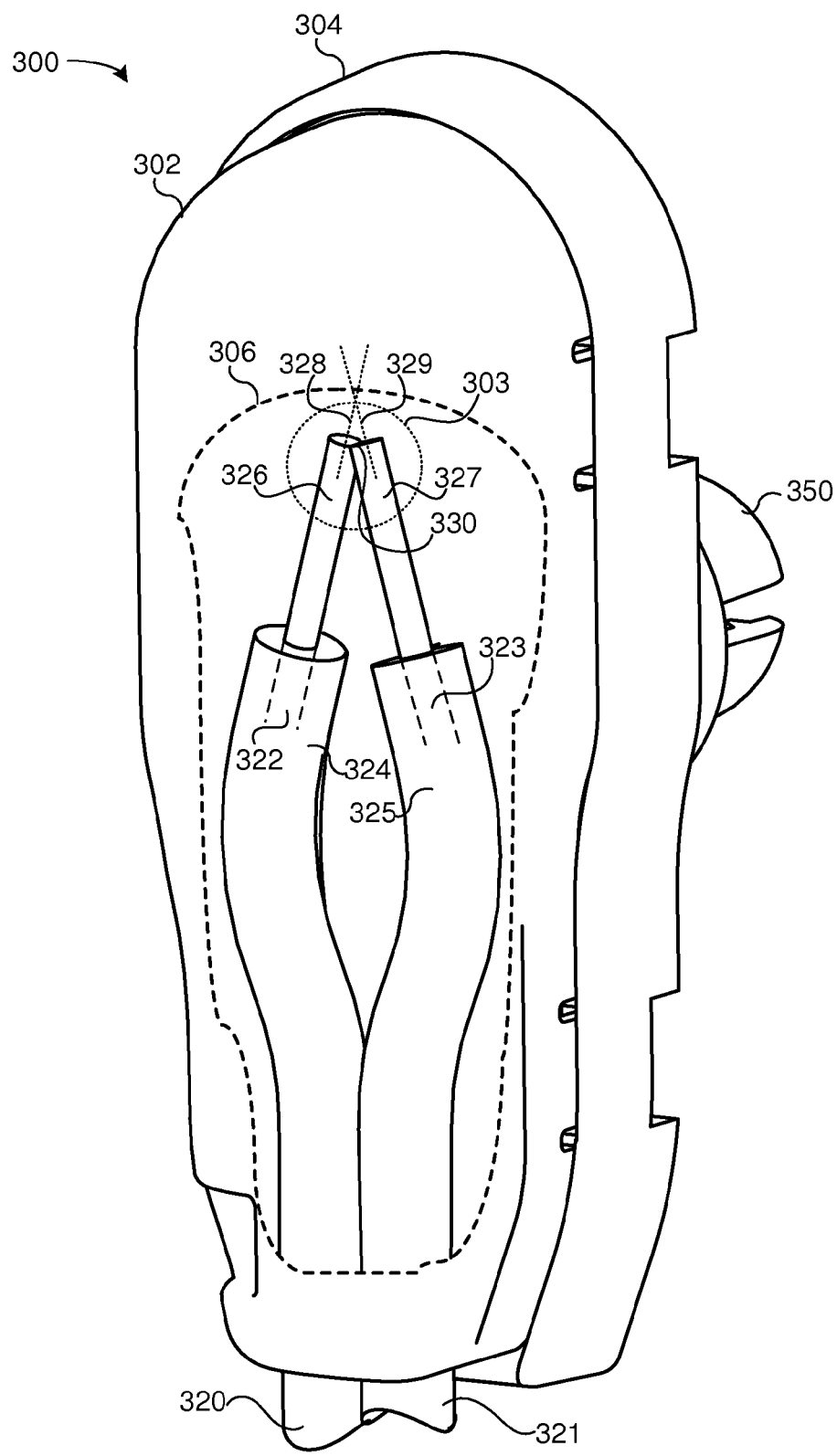
FIG. 3 illustrates one embodiment of an electro-optical radiation collector.

FIG. 3 depicts one example of an EO radiation collector 300. In the FIG. 3 example, the EO radiation collector 300 houses two EO conductor cables, a first EO conductor cable 320 and a second EO conductor cable 321. Each of the EO conductor cables 320 and 321 may comprise EO conductors 322 and 323 (e.g., fiber optic cables) within respective sheaths 324 and 325, which may be opaque to EO radiation (e.g., may be non-electro-optically conductive). As shown in FIG. 3, the sheathing 324 and 325 may be removed at respective end portions of the EO cables 320 and 321 to expose portions 326 and 327 of the EO conductors 322 and 323. The exposed portions 326 and 327 of the EO conductor cables 320 and 321 may allow EO radiation to be received thereby. EO radiation received by the exposed portions 326 and/or 327 may be transmitted within the EO conductor cables 320 and 321.

The exposed portions 326 and 327 may be secured within the EO radiation collector 300 at a particular orientation with respect to one another. However, alternative configurations and placements of the EO conductor cables 320 and 321 are possible through modification to the EO radiation collector 300 (e.g., modifications to the cap 302, the base portion 304, and the like).

In some embodiments, and as illustrated in FIG. 3, the EO conductor cables 320, 322 may be mounted within the EO radiation collector 300, such that the longitudinal axis 328 of the first EO conductor cable 320 is non-parallel with respect to the longitudinal axis 329 of the second EO conductor cable 321. The orientation of the longitudinal axes 328 and 329 may provide and/or facilitate EO transmission between the EO conductor cables 320 and 321. The EO transmission path electro-optically coupling the EO conductor cables 320 and 322, may allow EO radiation emitted from the first EO conductor cable 320 (via the exposed portion 326 thereof) to be received by the second EO conductor cable 321 (via the exposed portion 327), and vice versa. In some embodiments, and as shown in FIG. 3, the longitudinal axes 328 and 329 may intersect in 2D or 3D space.

In some embodiments, the EO transmission path between the EO conductor cables 320 and 321 may include the cap 302. Accordingly, the cap 302 may be configured to transmit EO radiation between the exposed portions 326 and 327 of the EO conductor cables 320 and 322. For example, the cap 302 may include material configured to diffuse EO radiation. Accordingly, a portion of EO radiation emitted from the exposed end 326 of the first EO conductor cable 320 may be diffused within the cap 302 material and received by the exposed end 327 of the second EO conductor cable 321. In some embodiments, an inner surface of the cap 302 may be treated with a reflective material and/or a material having refractive properties configured to direct EO radiation between the EO conductors 320 and 321. Alternatively, or in addition, the cap 302 may comprise reflective portions configured to reflect EO radiation between the portions 326 and 327. For example, the cap 302 may include a substantially smooth inner surface (not shown), which may be configured to direct EO radiation between the exposed portions 326 and 327 (e.g., a surface proximate to the exposed ends 326 and 327 of the EO conductor cables 320 and 321). One example of such a surface is described below in conjunction with FIG. 4B.

In some embodiments, the cap 302 may be configured to emit a portion of EO radiation received via the first and/or second EO conductor cables 320 and/or 321. Accordingly, when EO radiation is emitted into the EO radiation collector 300 via the exposed portion 326 of the first EO conductor cable 320 and/or the exposed portion 327 of the second EO conductor cable 321, a portion of the EO radiation may be emitted from the cap 302. If the EO radiation is in the visible spectrum, the emitted EO radiation may be visible by a human and/or detected by other EO radiation detection devices. The emission may allow a user (or other device) to confirm that EO radiation has been received by the EO radiation collector 300 (e.g., transmitted to the EO radiation collector 300 via the first and/or second EO conductor cable(s) 320 and/or 321).

As shown in FIG. 3, the ends of the exposed portions 326 and 327 may be secured at substantially the same location within in the cap 302 (e.g., at the same vertical offset within the cap 302). Accordingly, the exposed portions 326 and 327 may both be secured within an EO radiation receiving area 303 (discussed below).

In some embodiments, the exposed portions 326 and 327 may be in contact with one another at a contact location 330. The exposed portions 326 and/or 327 may be adapted to increase a contact area therebetween. For example, ends of the exposed portions 326 and 327 may be adapted (filed down) to increase the contact area therebetween (e.g., to create a contact plane between the portions 326 and 327 at the location 330). Although not shown in FIG. 3, in some embodiments, the ends of the exposed portions 326 and 327 may be secured in contact using a securing member, such as a clamping device, a clip, resilient member, adhesives, or the like.

As discussed above, the cap 302 may be formed of materials adapted to transmit EO radiation. Accordingly, incident EO radiation emitted in the vicinity of the EO radiation collector 300 may be transmitted through the cap portion 302 and into the exposed portions 326 and 327 of the EO conductor cables 320 and 321.

In some embodiments, the cap 302 may be configured to direct (e.g., focus) incident EO radiation (e.g., EO radiation emitted in the vicinity of the EO radiation collector) into an EO radiation receiving area 303. For example, the cap 302 may include portions of varying thickness and/or comprised of materials having different reflective and/or refractive properties, which may cause incident EO radiation to be directed to a particular location within the EO radiation collector 300. In the FIG. 3 example, the cap 302 is configured to cause incident EO radiation to be focused into the EO radiation receiving area 303. The nature (e.g., size, orientation, etc.) of the EO radiation receiving area 303 may be determined by the configuration of the cap 302 and/or other elements of the EO radiation collector 300 (e.g., additional lenses, surfaces, and the like). As described above, the cap 302 may include materials having differing thicknesses and/or of differing optical qualities, which may cause EO radiation to be directed to different locations within the EO radiation collector 300. In the FIG. 3 embodiment, the EO radiation collector 300 is configured to secure both of the exposed portions 326 and 327 of the EO conductor cables 320 and 321 the EO radiation receiving area 303. Accordingly, both the EO conductor cables 320 and 321 may be ideally situated within the EO receiving area 303 of the EO radiation collector 300 to receive incident EO radiation collected by the EO radiation collector 300.

In some embodiments, the cap 302 may be configured to diffuse EO radiation. For example, an outer surface of the cap 302 may include a plurality of indentations or dimples, which may cause incident EO radiation to be diffused within the cap 302. The diffusion may be configured to distribute incident EO radiation within the cap 302. The diffusion may allow incident EO radiation received from various angles and/or locations relative to the EO radiation collector 300 to be received at the EO receiving area 303. For instance, incident EO radiation may be diffused within the cap 302 (e.g., by dimples on the surface of the cap 302 and/or the material comprising the cap 302), which may cause the cap 302 to emit EO radiation, a portion of which may be transmitted into the EO radiation receiving area 303. In some embodiments, the diffused EO radiation may be directed to the EO receiving area 303 by adapting the thickness and/or refractive properties of the cap 302 material as described above.

Figure 4A:
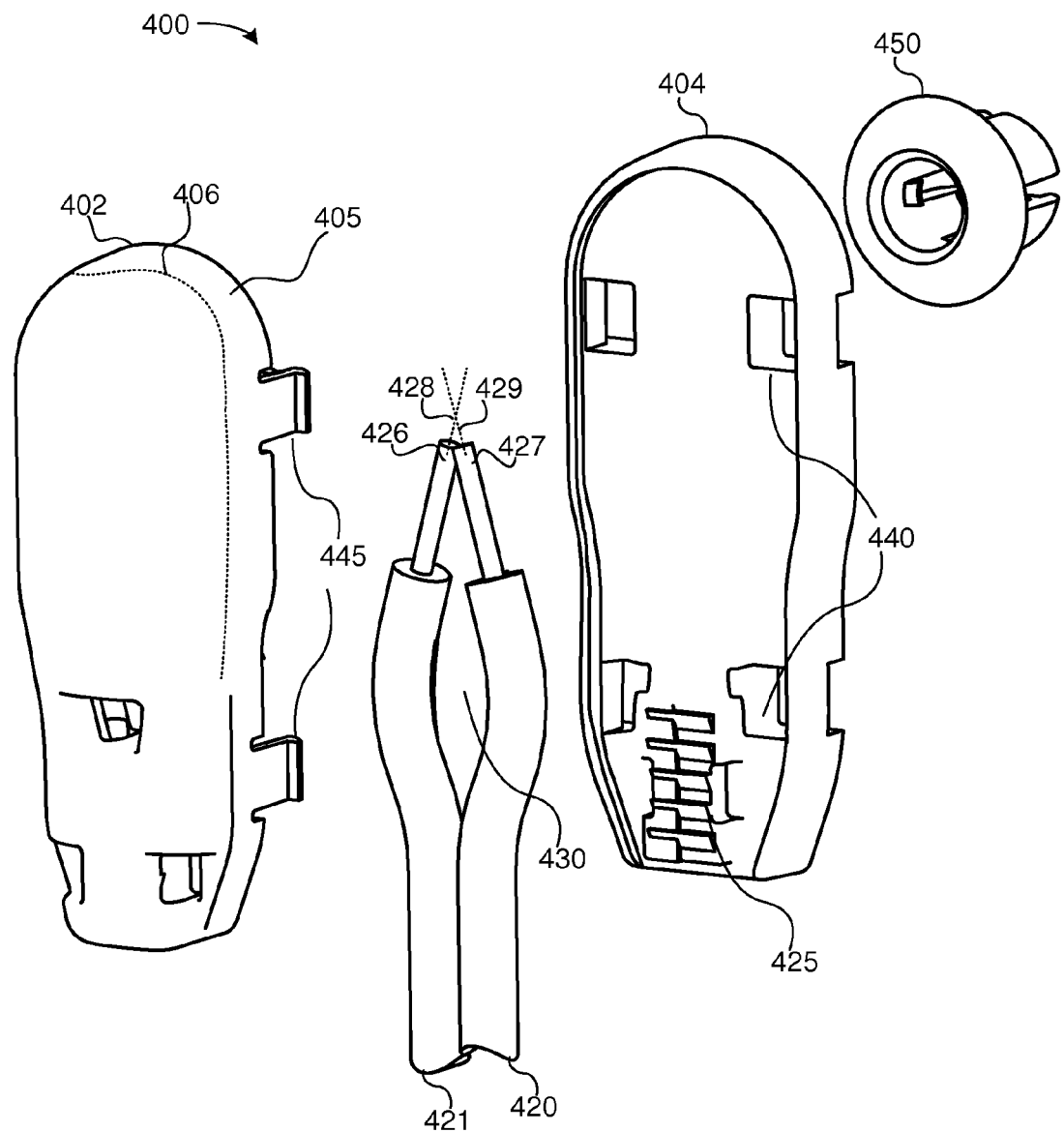
FIG. 4A is an exploded view of another embodiment of an electro-optical radiation collector.

FIG. 4A is an exploded view of another embodiment of an EO radiation collector 400. A cap 402 may be detached from a base portion 404 and a mounting portion 450 of the EO radiation collector 400. In the FIG. 4 example, the EO conductor cables 420 and 421 are depicted as if secured within the EO radiation collector 400. As illustrated, the exposed ends 426 and 427 of the EO conductor cables 420 and 421 may be mounted such that the longitudinal axes thereof (428 and 429) are non-parallel with respect to one another. In addition, in some embodiments, the longitudinal axes 428 and 429 may be intersecting (e.g., on a 2D plane and/or in 3D space).

The manufacture and configuration of an EO radiation collector 400 (e.g., the housing 402, base portion 404, and the like) may be according to various configurations and materials as are known in the art. According to some embodiments, the cap 402 and the base portion 404 may be formed from electrically non-conductive materials. The EO radiation collector 400 may be modified for a particular application in which specific materials, sizes, or configurations are desired. The EO radiation collector 400, comprising the base 404 and the cap 402, may be manufactured as one piece or as two or more separable and/or inseparable pieces.

In some embodiments, the cap 402 may be secured to the base portion 404 by a fastening means, such as a weld, adhesive, fusing, snaps, clips, resilient members, cement, zip ties, and/or other fastening means known in the art. In the FIG. 4 example, the cap 402 includes protruding clips 445 configured to mate with clip receivers 440 in the base portion 404. Insertion of the clips 445 into the receiver 440 may secure the cap onto the base portion 404.

The EO radiation collector 400 may include means for securing one or more EO conductor cables (e.g., cables 420 and/or 421). The securing means may include any means for securing EO conductor cables known in the art including, but not limited to: adhesives, glue, clips, resilient members, gripping members, resilient teeth, clamping mechanisms, clamping members, zip ties, or the like. In the FIG. 4A example, the base portion 404 includes a gripping member 425 configured to secure the EO conductor cables 420 and 421 within the EO radiation collector 400. The gripping member 425 may comprise a plurality of resiliently deformable teeth adapted to frictionally engage and secure the EO conductor cables 420 and/or 421. Although not shown in FIG. 4, an additional member (an independent component and/or formed as part of the base portion 404 and/or cap portion 402) may be adapted to position the exposed ends 426 and/or 427 in a particular orientation within the EO radiation collector (e.g., provide the bend 430 in the EO conductor cables 420 and 421 depicted in FIG. 4A). The additional member may be a protrusion, grooves, or any other means for positioning the EO conductor cables 420 and/or 421 in a particular orientation.

The EO collector 400 may include a mounting portion 450 to secure the EO radiation collector 400 onto a particular type of surface (e.g., within a switchgear enclosure or housing). Depending on the desired mounting surface, a wide variety of conceivable features 450 may be used, such as an adhesive patch, a bolt receiver, one or more clips adapted to be received by a clip receiver, or the like.

As illustrated in FIG. 4A, the EO radiation collector 400 may receive two EO conductor cables 420 and 421, which may enter the EO radiation collector 400 from a bottom portion of the cap 402 and/or base portion 404. According to alternative embodiments, the EO radiation collector 400 may be adapted to receive any number of EO conductor cables of various types. Additionally, the EO radiation collector may be adapted to receive the EO conductor cables from the sides, top, bottom, and/or a combination thereof. Moreover, means for receiving the EO conductor cables (e.g., the cable entrances and securing means) may be configured to allow one EO conductor cable to be removed while other cable(s) within the EO radiation collector 400 remain fixedly secured. As previously discussed, according to various embodiments, the plurality of cables entering the EO radiation collector 400 may be oriented and/or bent, such that the longitudinal axes of each of the cables are not parallel with one another, that the exposed portions of the EO conductor cables are within a receiving area of the EO radiation collector (e.g., the EO radiation receiving area 303 of FIG. 3), the ends of the exposed portions of the EO conductor cables therein are at substantially the same height and/or position as one another, and/or EO radiation transmitted from one of the EO conductor cables may be received by one or more of the other EO conductor cables and/or emitted from the cap 402.

As discussed above, portions of an outer surface 405 of the cap 402 may comprise indentations and/or dimples configured to diffuse incident EO radiation within the cap 402. The dimples may be adapted to diffuse EO radiation indicative of an arc flash event (e.g., EO radiation having a wavelength and/or intensity typically produced in arc flash events). The dimples may cover the entire outer surface 405 of the cap 402 or only a portion thereof (in a periphery region 406). For example, in some embodiments, the dimples on the cap 402 may be primarily disposed on the surface of a periphery region 406 of the cap 402. As shown in FIG. 4A, the periphery region 406 may include a top-rear region and/or side regions of the cap 402. Accordingly, the periphery region 406 may receive incident EO radiation emitted from behind and/or the side of the EO radiation collector 400. The incident angle of the EO radiation so received may make it difficult to direct the incident EO radiation towards the exposed ends 426 and 427 of the EO conductor cables 420 and 421. The diffusion provided by the dimpling on the surface 405 and/or within the periphery region 406 may allow for EO radiation to be received by the exposed portions 426 and 427.

Figure 4B:
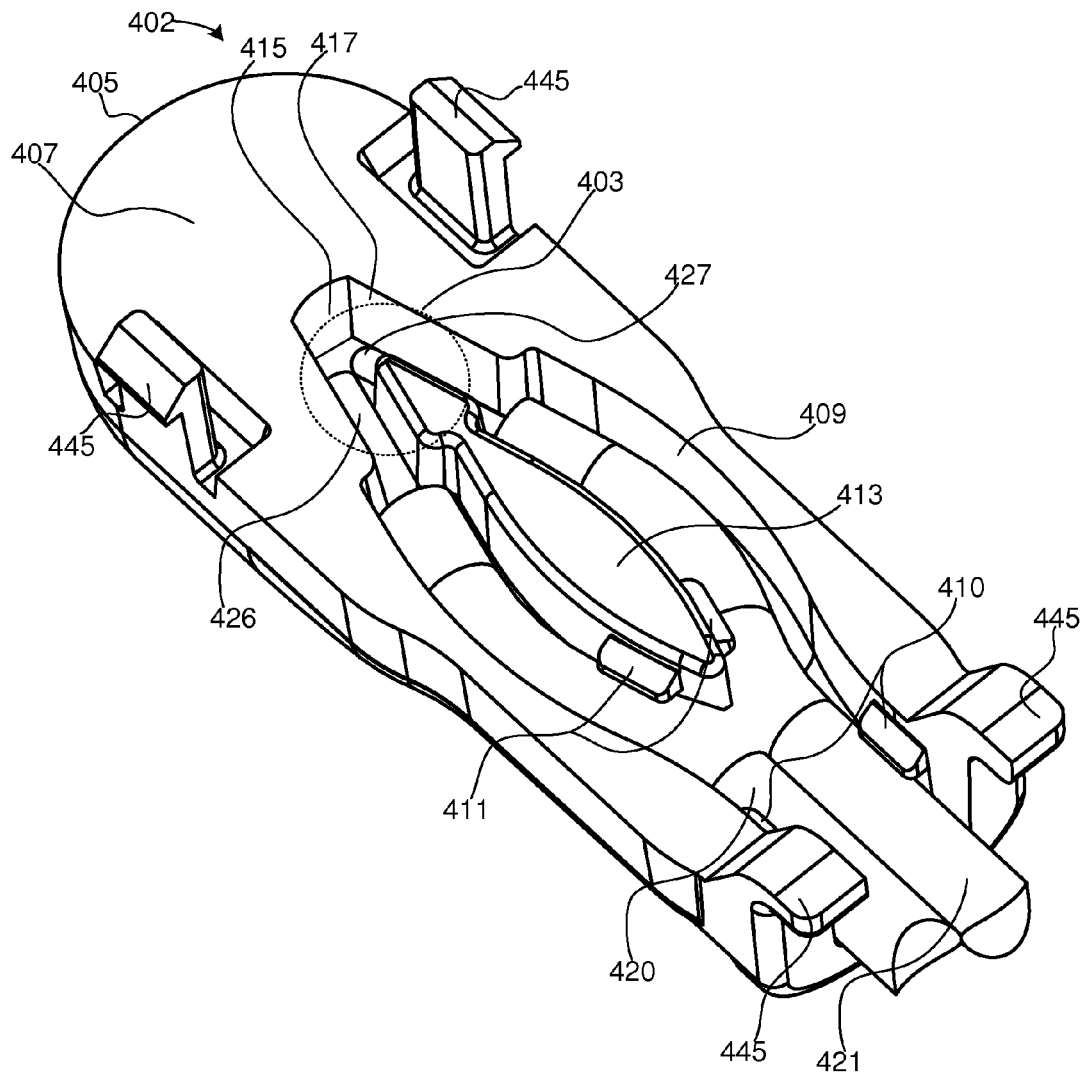
FIG. 4B is an exploded view of a cap of an electro-optical radiation collector.

FIG. 4B depicts another embodiment of an EO radiation collector cap. FIG. 4B provides a view of an inner portion of the cap 402. As discussed above, the material comprising the cap 402 may have a thickness profile 407 configured to direct incident EO radiation into a receiving area 403. As shown in FIG. 4B, the exposed portions 426 and 427 of the EO conductor cables 420 and 421 may both be secured within the EO radiation receiving area 403.

The EO conductor cables 420 and 421 may be secured at a particular orientation within the cap 402 by an indentation 409 therein. The indentation 409 (along with the protrusion 413) may be configured to maintain the EO conductor cables 420 and 421 in the non-parallel-axis orientation described above. In the FIG. 4B example, the EO conductor cables are secured within indentation 409 by clip members 410 and 411. The clip members 410 may be configured to frictionally engage the EO conductor cables 420 and 421 as they enter the cap 402. The clip members 411 may be configured to frictionally engage the EO conductor cables 420 and 421 to the protrusion 413. The protrusion 413 may be adapted to orient the EO conductor cables 420 and 421 in the non-parallel-axis orientation described above. The cap 402 of FIG. 4B may be secured to a base portion (not shown) by protruding clip members 445.

As discussed above, in some embodiments, the cap 402 may be configured to diffuse incident EO radiation. The diffusion may be provided by the material 407 comprising the cap 402 and/or by features (e.g., indentations and/or dimples) disposed on an outer surface 405 of the cap 402.

In some embodiments, the material 407 from which the cap 402 is formed may be configured to direct incident EO radiation into the EO receiving area 403. The incident EO radiation may be directed by adapting the thickness profile of the material 407 and/or selecting different material configurations (e.g., materials having different refractive properties).

As discussed above, EO radiation emitted from one of the EO conductor cables 420 and/or 421 may be received by the other EO conductor cables 421 and/or 420. Accordingly, an EO transmission path may exist between the EO conductor cables 420 and 421. The EO transmission path may be provided by the orientation of the EO conductor cables 420 and 421 (e.g., in a non-parallel axis orientation). In some embodiments, EO radiation may be transmitted between the EO conductor cables 420 and 421 via the cap 402 (e.g., the cap 402 may provide a portion of the EO transmission path). In some embodiments, a portion of the inner surface of the cap 402 (portion 415) may be configured to be reflective. Accordingly, a portion of EO radiation emitted from the EO conductor 420 and/or 421 may be reflected into the other EO conductor 421 and/or 420. The reflective properties of the surface portion 415 may be provided by smoothing the surface portion 415, depositing a layer of reflective material on the surface portion 415, or the like. Inner side portions 417 of the cap may be similarly treated. The reflective treatment applied to the inner portion 415 and/or 417 of the cap 402 may be configured to allow the portions 415 and/or 417 to transmit incident EO radiation to the exposed portions 426 and 427 (e.g., the reflection may be substantially one-way, such that incident EO radiation is not reflected out of the cap 402).

Figure 5:
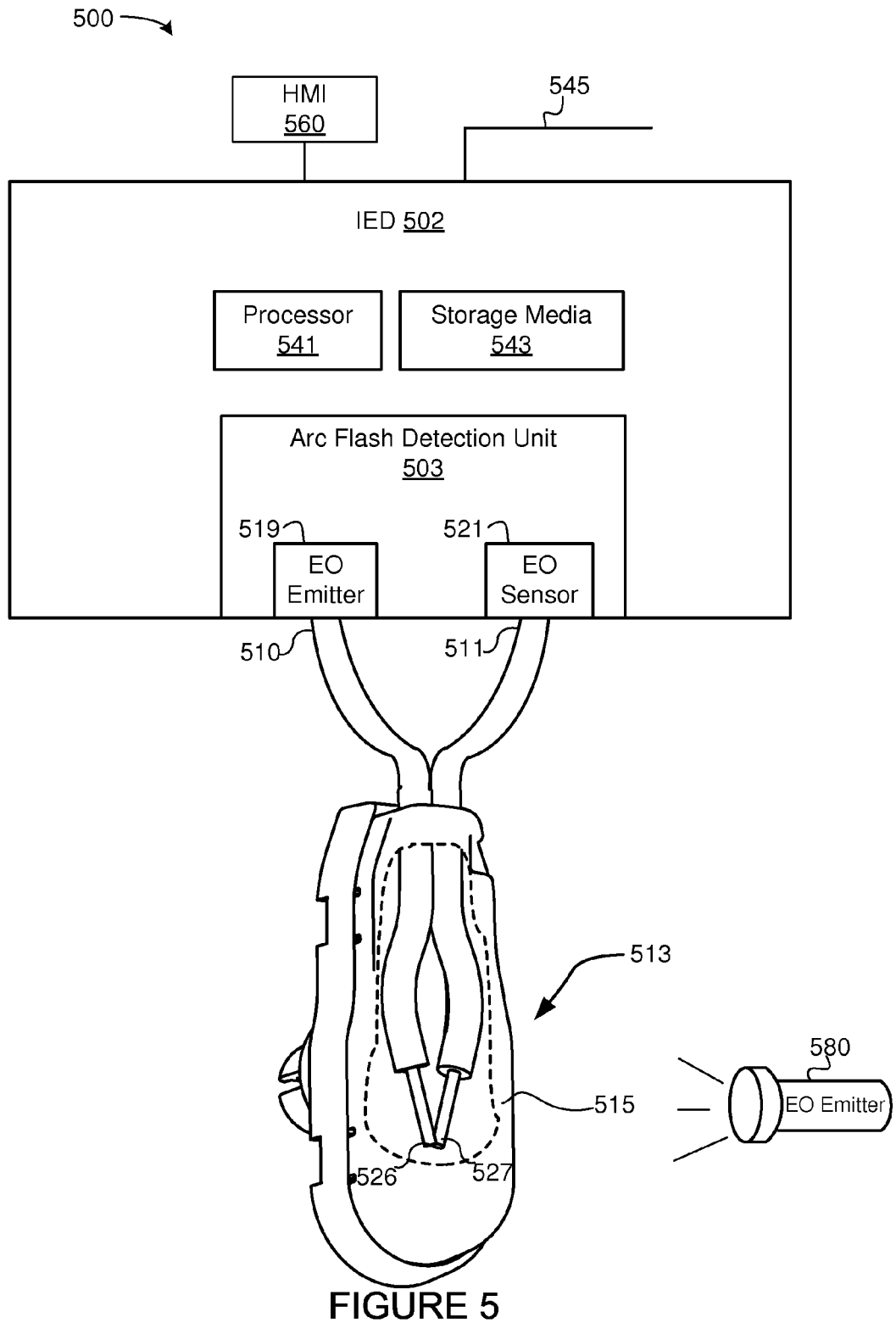
FIG. 5 is a block diagram of one embodiment of an arc flash protection device configured to receive electro-optical radiation collected by an electro-optical radiation collector.

FIG. 5 provides an exemplary block diagram of an arc flash detection device having an EO radiation collector. The apparatus 500 may be capable of performing a self-test to validate the proper operation and/or configuration of the EO radiation collectors connected thereto (e.g., the EO radiation collector 513) and/or the electro-optical connection between the EO radiation collector 513 and the apparatus 500 (e.g., the EO conductor cables 510 and 511).

As shown in FIG. 5, the EO radiation collector 513 may be similar to the EO radiation collectors 300 and/or 400 disclosed above in conjunction with FIGS. 3, 4A, and 4B.

The apparatus 500 may include an arc flash detection unit 503, which may be implemented similarly to the AFDU 103 and/or 203 disclosed above in conjunction with FIGS. 1A, 1B, and/or 2. The AFDU 503, or portions thereof, may be implemented within an IED 502. Alternatively, the AFDU 503 may be implemented independently of the IED 502.

The AFDU 503 and/or IED 502 may be communicatively coupled to the EO radiation collector 513 by EO conductor cables 510 and 511. The EO conductor cables 510 and 511 may include an EO conductor sheathed in a non-EO conductive sheathing. End portions 526 and 527 of the EO conductor cables 510 and 511 may be secured within the EO radiation collector 513 as described above (e.g., may be secured so that their longitudinal axes are non-parallel with respect to one another and/or so that exposed portions 526 and 527 thereof are within an EO radiation receiving area). In some embodiments, ends of the EO conductor cables 510 and 511 may be in contact.

According to the illustrated embodiment, the IED 502 and/or the AFDU 503 may include a processor 541 (which may be a microprocessor, field programmable gate array (FPGA), application specific integrated circuit (ASIC), or the like) and computer-readable storage media 543 (e.g., disk storage, optical storage, Flash memory, RAM, or the like). The AFDU 503 may use the processor and/or storage media 543 to provide arc flash monitoring and protection functionality, including self-test. The computer-executable instructions for the self-test functions may be stored within the storage media 543. The self-test may be configured to automatically operate on a scheduled basis (for example, every four hours), continuously, and/or operate when a command is received via a human-machine interface (not shown), communications link or interface 545, or the like.

The orientation of the EO conductor cables 510 and 511 within the EO radiation collector 513 may allow EO radiation to be transmitted therebetween. Accordingly, EO radiation emitted from the end 526 of the EO conductor cable 510 may be received by the end 527 of the EO conductor cable 511 and vice versa. In some embodiments, the EO radiation collector 513 may be configured to provide an EO transmission path between the exposed portions 526 and 527 of the EO conductor cables 510 and 511. The EO transmission path may be enabled by the non-parallel orientation of the exposed portions 526 and 527 within the EO radiation collector 513. For example, a cap 515 (or other components) of the EO radiation collector 513 may be configured to transmit EO radiation between the exposed portions 526 and 527 of the EO conductor cables 510 and 511. The cap 515 may be comprised of materials configured to refract and/or reflect EO radiation between the cables 510 and 511. In addition, portions of an inner surface of the cap 515 may include reflective portions (e.g., the reflective surface 415 and/or 417 of FIG. 4B) configured to reflect EO radiation between the exposed portions 526 and 527.

In some embodiments, a self-test may comprise causing an EO emitter 519 to emit EO radiation into the first EO conductor cable 510. The EO emitter 519 may comprise any EO radiation source known in the art, including, but not limited to: a flash bulb, a light emitting diode (LED), or the like. If the EO conductor cable 510 is functioning properly, EO radiation produced by the EO emitter 519 may be transmitted to the EO radiation collector 513 by the EO conductor cable 510. The EO radiation may be emitted into the EO radiation collector 513 via the exposed portion 526 of the EO conductor cable 510. The EO radiation emitted into the EO radiation collector 513 may be transmitted into the second EO conductor cable 511 via the exposed portion 527 (e.g., via the EO transmission path described above).

The EO radiation collector 513 may be configured to emit a portion of the received EO radiation, allowing a human observer (or other detection means) to detect the EO radiation received thereby (e.g., to verify that the EO conductor cable 510 is capable of transmitting EO radiation into the EO radiation collector 513).

If the EO radiation collector 513 is operating properly and/or is properly configured (e.g., the exposed portions 526 and 527 are properly oriented within the EO radiation collector 513 and the like), EO radiation transmitted into the EO radiation collector 513 via EO conductor cable 510 may be received by the second EO conductor cable 511 and transmitted to the EO sensor 521. The EO sensor 521 may be configured to convert the received EO radiation into a signal (e.g. current and/or voltage signal), which, as discussed above, may be filtered, amplified, and/or quantized (e.g., by an A/D converter). The resulting signal may then be received by the AFDU 503 and/or processor 541, which may validate the operation and/or configuration of the EO radiation collector 513 and/or the EO conductor cables 510 and 511.

In some embodiments, if an EO signal is emitted from the EO emitter 519, but no EO signal is received by the EO sensor 521 (or the signal is below an attenuation threshold), the AFDU 503 and/or IED 502 may detect a self-test failure. In response to detecting a self-test failure, the AFDU 503 and/or the IED 502 may take one or more actions including, but not limited to: asserting one or more alarms, transmitting one or more alert signals (e.g., via the communications interface 545), tripping one or more breakers, or the like. The alarms and/or alerts may be presented on a human-machine interface 560 (e.g., via audio queues, visual indications, or the like).

If EO radiation is detected by the EO sensor 521 (and has an intensity above a threshold), the AFDU 503 and/or IED 502 may detect a self-test pass. The self-test may further comprise determining an attenuation of the EO radiation as it is transmitted through the first EO conductor cable 510, the EO radiation collector 513, and the second EO conductor cable 511. If the attenuation exceeds a threshold, the self-test operation may fail; otherwise, the self-test may pass. The attenuation may be displayed on the human-machine interface 560, may be transmitted on a communications interface 545, or the like.

In some embodiments, the AFDU 503 and/or IED 502 may be configured to stop arc flash monitoring during a self-test operation. Alternatively, or in addition, the AFDU 503 and/or the IED 502 may be configured to distinguish between EO radiation received as part of a self-test operation and EO radiation indicative of an arc flash event. For instance, in some embodiments, the AFDU 503 and/or the IED 502 may be configured to cause the EO emitter 519 to emit EO radiation according to a particular pattern. The pattern may comprise a low-correlation coded signal or waveform. During a self-test operation, the EO sensor 521 may receive return signals indicative of the coded signal. Accordingly, the AFDU 503 and/or IED 502 may be capable of distinguishing between EO radiation indicative of an arc flash event and EO radiation received as part of a self-test, which may allow the apparatus 500 to perform self-testing while simultaneously providing arc flash monitoring and/or protection. The simultaneous self-test and/or monitoring may be provided independently of the nature of the EO radiation emitted by the EO emitter 519. Accordingly, the EO radiation pattern emitted by the EO emitter 519 may be of the same wavelength, frequency, and/or intensity as would be produced in an arc flash event. As such, the self-test may be capable of validating the EO radiation collector 513 and/or EO conductor cables 510 and 511 within the parameters (e.g., frequency, wavelength, and/or intensity) of an actual arc-flash event. Alternatively, or in addition, the EO emitter 519 may be configured to emit EO radiation of a different frequency and/or wavelength than that produced during an arc flash event. The resulting EO signals may be distinguished by the AFDU 503 and/or IED 502 to prevent false arc flash detections.

In some embodiments, a self-test operation may determine where a self-test failure has occurred (or reduce the search space for the failure point). As discussed above, the EO radiation collector 513 may be configured to emit EO radiation received via an EO cable 510 and/or 511 (e.g., via the cap 515). An additional sensing device (not shown), such as a human observer (or additional EO radiation collector (not shown)) may be placed within an EO path of the EO radiation collector 513 to detect EO radiation emitted thereby. If, during a self-test, EO radiation is detected from the EO radiation collector 513, but no return signal is received via the EO conductor cable 511, the IED 502 and/or AFDU 503 may determine that the EO conductor cable used to transmit the EO signal to the EO radiation collector 513 (e.g., EO conductor cable 510) is operable, but that a fault exists within the EO radiation collector 513 and/or in the EO conductor cable 511. The self-test may switch the EO conductor cables and re-run the self-test (e.g., connect the EO emitter 519 to the EO conductor cable 511 and the EO sensor 521 to the EO conductor cable 510). The switch may be made via an EO switching device (not shown), modification of physical connections, or the like. If, after the switch, the EO radiation collector 513 emits EO radiation during the self-test, the fault may be determined to be in the EO radiation collector itself 513 (since the other EO conductor cable, cable 511, has transmitted EO radiation to the EO radiation collector 513). If the EO radiation collector 513 does not emit EO radiation after the switch, the fault may be determined to be in the EO conductor cable 511. Although a particular self-test scenario is described herein, the disclosure is not limited in this regard. The AFDU 503 and/or the IED 502 may be configured to perform any self-test and/or adaptive self-test known in the art.

The status of the self-test operations performed by the IED 502 and/or AFDU 503 may be displayed on an HMI 560 and/or communicated via a communications interface 545. Alternatively, or in addition, the results of the self-test operations may be stored on the computer-readable storage media 543. The results may be made available to personnel via the HMI 560 or other interface (e.g., interface 545). The display and/or results of the self-test may include the attenuation (if any) observed during the test (e.g., a difference between the intensity of EO radiation transmitted into the EO radiation collector 513 versus the intensity of the EO radiation received by the EO sensor 521), the response time of the AFDU 503 and/or IED 502 to detect the return signal, a probable location of the failure (if any), or the like.

As discussed above, EO radiation transmitted into the EO radiation collector 513 (e.g., via the EO conductor cable 510) may illuminate portions of the collector 513, such as the cap 515. The illumination may be used for diagnostics, testing, and/or maintenance of the system 500. For instance, in some embodiments, the AFDU 503 and/or IED 502 may be configured to emit visible EO radiation into the EO radiation collector 513 responsive to detecting EO radiation at a particular threshold therefrom. The threshold may be selected to exceed the ambient EO radiation levels to which the EO radiation collector 513 is typically exposed. In some embodiments, the threshold may include an upper bound to prevent the EO emitter 519 from operating during an arc flash event. The emitted EO radiation may illuminate the EO radiation collector 513, thereby providing a visual confirmation that the EO radiation collector 513 is operating properly (e.g., is capable of collecting EO radiation, transmitting the collected EO radiation to the EO sensor 521, and receiving EO radiation from the EO emitter 519).

In one example, an EO radiation emitter 580 may be used to emit EO radiation into the EO radiation collector 513. The EO radiation emitter 580 may comprise a flashlight, an LED, flashbulb, incandescent light source, fluorescent light source, or any other device capable of emitting EO radiation. The EO radiation emitter 580 may be operated by a human, by the ADFU 503 and/or IDE 502, and/or some other device (e.g., a dedicated testing and validation device (not shown)). As discussed above, a portion of the EO radiation emitted by the EO radiation emitter 580 may be collected by the EO radiation collector 513 and transmitted to the EO sensor 521 via the EO conductor cable 511. Responsive to detecting the EO radiation, the AFDU 503 and/or IED 502 may cause the EO emitter 519 to emit visible EO radiation into the EO conductor cable 510. The emitted EO radiation may illuminate the EO radiation collector 513 with visible light, which may provide a visual confirmation that the EO radiation collector 513 is functioning properly (e.g., the EO radiation collector 513 may "glow" red). In some embodiments, the EO radiation emitter 580 may further include an EO sensor (not shown), which may provide for automated detection of EO radiation emitted from the EO radiation collector 513.

Figure 6:
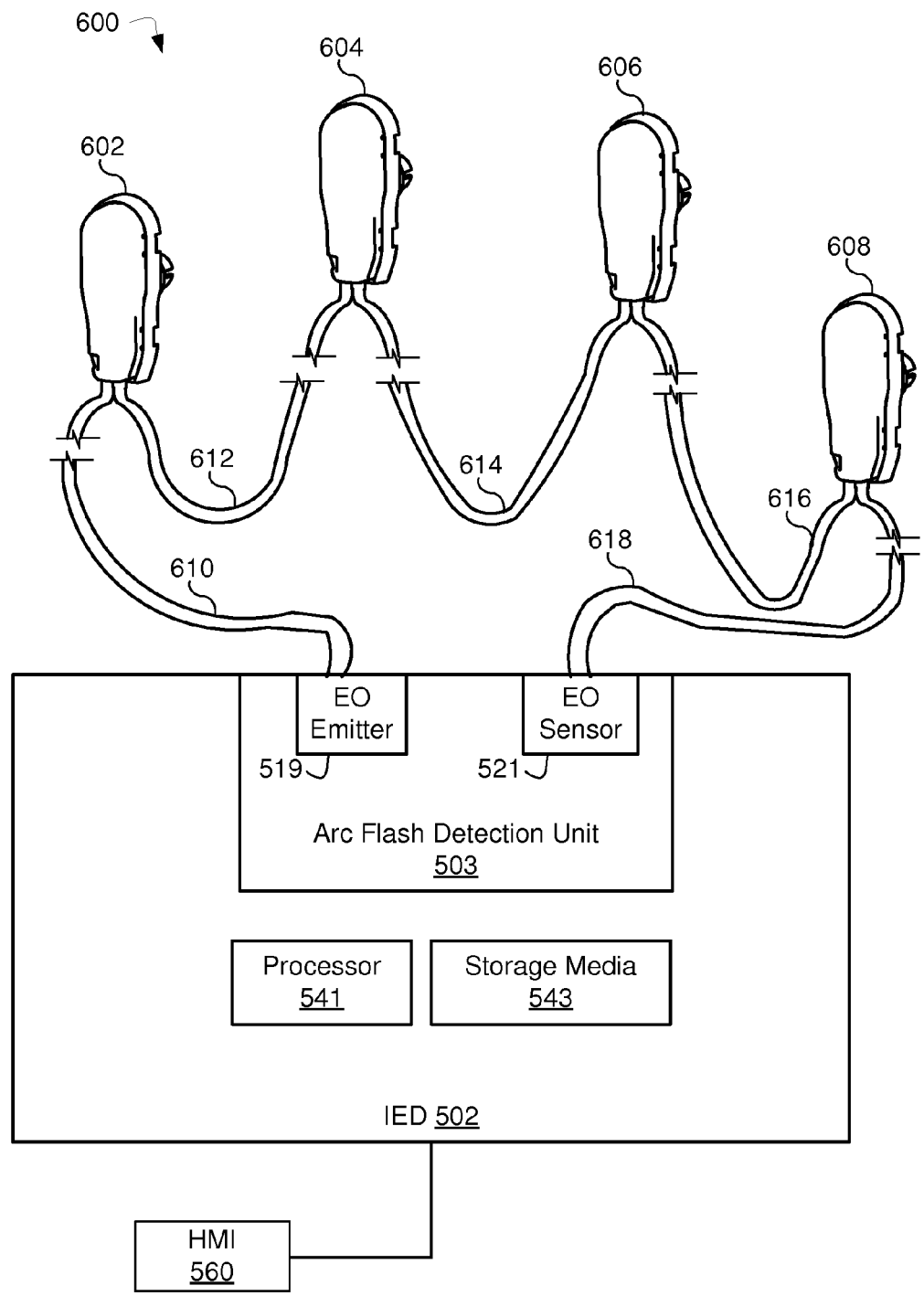
FIG. 6 is a block diagram of another embodiment of an arc flash protection device configured to receive electro-optical radiation collected by one or more electro-optical radiation collectors.

FIG. 6 illustrates one embodiment of a system 600 comprising a plurality of electro-optically coupled EO radiation collectors 602, 604, 606, 608. The EO radiation collectors 602, 604, 606, and 608 may be electro-optically coupled to an IED 502 and/or AFDU 503.

The EO radiation collectors 602, 604, 606, and 608 may be electro-optically connected in a series arrangement (daisy chain) using EO transmission cables 610, 612, 614, 616, and 618. Although a daisy chain arrangement is shown herein, the disclosure is not limited in this regard. In other embodiments, EO radiation collectors (such as the EO radiation collectors 602, 604, 606, and/or 608) could be arranged in a web pattern, a branching arrangement, in a graph, or other formation. The alternative configurations may include the use of more than two EO conductor cables in a particular EO radiation collector, the use of branching EO conductor cables, EO radiation repeaters, or the like.

In the FIG. 6 example, the EO conductor cable 610 is in electro-optical communication with an EO emitter 519 and the EO radiation collector 602. The EO conductor cable 612 electro-optically connects the EO radiation collector 602 to the EO radiation collector 604, which is electro-optically coupled to the EO radiation collector 606 by the EO conductor cable 614, which is electro-optically coupled to the EO conductor 608 via the EO conductor cable 616. The EO radiation collector 608 is electro-optically coupled to the EO sensor 521 via the EO conductor cable 618.

The EO radiation collectors 602, 604, 606, and/or 608 may be configured to provide an EO transmission path between the EO conductor cables received therein (e.g., the EO conductor cables 610 and 612 may be electro-optically coupled within the EO radiation collector 602, the EO conductor cables 612 and 612 may be electro-optically coupled within the EO radiation collector 604, and so on). As described above, the transmission of EO radiation between the EO conductor cables within the EO radiation collectors 602, 604, 606, and/or 608 may be enabled by an orientation in which the EO conductors are secured therein (non-parallel longitudinal axis orientation), by the configuration of the EO radiation collectors 602, 604, 606, and/or 608 (e.g., properties of a cap portion of the EO radiation collectors 602, 604, 606, and/or 608), and the like.

In a self-test operation, EO radiation emitted by the EO emitter 519 may be transmitted into the EO conductor cable 610 to be received at the EO radiation collector 602. The EO radiation received at the EO radiation collector 602 may be transmitted into the EO conductor cable 612 (via the EO transmission path provided by the EO radiation collector 602) to the EO radiation collector 604, which, in turn, may be transmitted to the EO radiation collectors 606 and 608 as described above. The emitted EO radiation received at the EO radiation collector 608 may be transmitted to the EO sensor 521 via the EO conductor cable 618. The EO sensor 521 may detect the emitted EO radiation returning from the EO radiation collector 608. The AFDU 503 and/or IED 502 may use the detected EO radiation corresponding to the emitted EO radiation to determine a result of the self-test operation. If EO radiation corresponding to the emitted EO radiation is received by the EO sensor 521 (and has not been attenuated beyond a threshold), the self-test operation may pass. If no EO radiation is returned and/or if the returning EO radiation has been attenuated more than a threshold amount, the result of the self-test operation may be a failure.

The location of a self-test failure may be isolated by detecting EO radiation emitted from the EO radiation collectors 602, 604, 606, and/or 608 during a self-test operation. As discussed above, the EO radiation collectors disclosed herein may be configured to emit EO radiation when EO radiation is received via an EO conductor cable (e.g., emitted from a cap of the EO radiation collector). During a self-test, EO radiation may be emitted from each of the EO radiation collectors 602, 604, 606, and/or 608 that the emitted EO radiation has reached. If EO radiation does not reach a particular EO radiation collector (602, 504, 606, or 608), a location of the fault preventing EO radiation from reaching the collector may be isolated. For example, if emitted EO radiation illuminates the EO radiation collectors 602 and 604, but not 606 or 608, it may be determined that a fault exists in the EO radiation collector 604 and/or in the EO conductor cable 614, since the fault presumably does not exist in the EO conductor cables 610 and/or 602 since the EO radiation collectors 602 and 604 are receiving the emitted EO radiation.

In some embodiments, a second set of one or more EO radiation collectors (not shown) may be configured to receive EO radiation emitted from the EO radiation collectors 602, 604, 606, and/or 608. The EO radiation detected by the second set of EO radiation collectors may be used to isolate the location of the cause of a self-test failure. In some embodiments, the second set of EO radiation collectors may be configured to determine an attenuation of the emitted EO radiation signal as it flows between the EO radiation collectors 602, 604, 606, and/or 608. The location of the cause of a self-test failure may correspond to high-levels of attenuation (e.g., high-level of attenuation may exist between the EO radiation collectors 602 and 604, which may indicate that the EO conductor cable 612 is not operating properly).

Alternatively, or in addition, a technician (or other human) may observe the EO radiation emitted from the EO radiation collectors 602, 604, 606, and/or 608 during a self-test operation to visually identify a probable location of the cause of a self-test failure. As discussed above, the AFDU 503 and/or IED 502 may be configured to cause the EO emitter 519 to illuminate the EO radiation collectors 602, 604, 606, and/or 608 responsive to detecting EO radiation at the EO sensor 521 (e.g., from a flashlight or other EO radiation emitter (not shown)). The illumination may provide a visual confirmation that the EO radiation collectors 602, 604, 606, and/or 608 are functioning properly.

Figure 7:
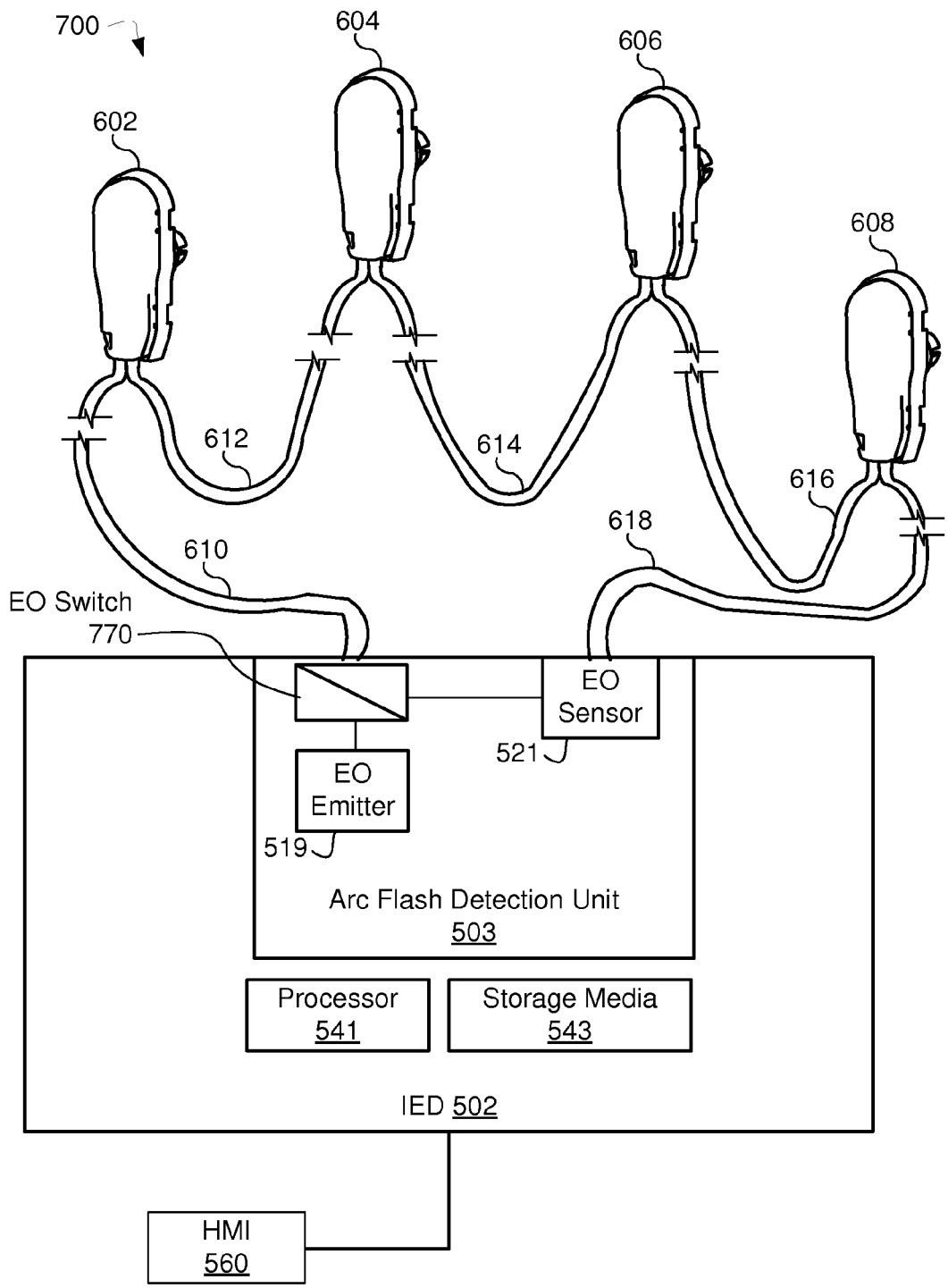
FIG. 7 is a block diagram of another embodiment of an arc flash protection device configured to receive electro-optical radiation collected by one or more electro-optical radiation collectors.

FIG. 7 depicts another example of a device for detecting an arc flash event using an EO radiation collector. In the example 700, the AFDU 503 and/or IED 503 includes an EO switch component 770, which may be configured to selectively, electro-optically couple the EO conductor 610 to the EO emitter 519 and/or the EO sensor 521. The EO switch 770 may be configured to electro-optically couple to the EO emitter 519 to the EO conductor 610 during a self-test operation. When so configured, the EO conductor 610 may receive EO radiation emitted by the EO emitter 519. When self-testing is not being performed, the EO switch 770 may be configured to electro-optically couple the EO conductor 610 to the EO sensor 521. In this configuration, EO radiation collected by the EO radiation collectors 602, 604, 606, and/or 608 and transmitted through the EO conductors (612 and/or 614) may be received by the EO sensor 521 via the EO conductor 610. As such, EO radiation indicative of an arc flash event may be received by the EO sensor 521 via redundant electro-optical paths. Accordingly, even if one or more of the EO conductor cables 612, 614, and/or 618 fails (is incapable of transmitting EO radiation), EO radiation may be received via the alternative path provided by the electro-optical coupling of the EO conductor cable 610 to the EO sensor 521.

In alternative embodiments, the EO switch 770 may be replaced by other electro-optical elements, such as splitters, electro-optical elements configured to transmit EO radiation into the EO conductor 610 while isolating the EO sensor 521 from the emitted EO radiation, or the like. Accordingly, the disclosure should not be read as limited to the use of any particular EO switching element or mechanism.

In some embodiments, an additional EO switching element (not shown) may be provided between the EO sensor 521 and the EO conductor cable 618. The additional switching element may be used to direct EO radiation emitted by the EO emitter 519 into the EO conductor 618, which may allow the "order" of a self-test operation to be reversed (e.g., reverse the flow of EO radiation through the collectors 602, 604, 606 and/or 608 during a self-test operation). As discussed above, reversing the flow of a self-test operation may be used to isolate the cause of a self-test failure.

In another variation, the EO emitter 519 and EO sensor 521 elements may be replaced by an EO transceiver element, which may be electro-optically coupled to both the EO conductors 610 and 618. The EO transceiver may be configured to emit and sense EO radiation on either of the EO conductor cables 610 and/or 618.

Although the AFDU 503 and IED 502 is depicted as electro-optically coupled to a plurality of EO radiation collectors 602, 604, 606, and 608 in a daisy chain arrangement, the example 700 could be modified to include only a single EO radiation collector, incorporate EO radiation collectors of different types (e.g., loop EO radiation collectors), arrange the EO radiation collectors in different configurations, or the like.

Additionally, in alternative embodiments of the example 700 (or the examples 500 and/or 600 described above), the EO radiation collectors 602, 604, 606, and/or 608 could be modified to include one or more EO radiation amplifiers, EO radiation repeaters, EO sensors, and the like. In this way, the effects of EO radiation attenuation within the daisy chain configuration (or on a long run of an EO conductor cable) could be mitigated and/or obviated.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable storage media suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention.

What is claimed is:

1. An electro-optical (EO) radiation collector, comprising:
a cap comprising an EO radiation receiving area; and
a securing mechanism configured to secure an exposed portion of an EO radiation conductor cable within the EO radiation receiving area such that the cap encloses the exposed portion of the EO radiation conductor, the EO radiation conductor cable further comprising a sheathed portion at an entrance of the EO radiation conductor cable into the cap, wherein the securing mechanism is further configured to bend the EO radiation conductor cable within the cap such that a longitudinal axis of the exposed portion of the EO radiation conductor cable is non-parallel to a longitudinal axis of the sheathed portion of the EO radiation conductor cable at the entrance of the EO radiation conductor cable into the cap, and
wherein the cap comprises an outermost surface that receives incident EO radiation external to the EO radiation collector, and wherein the cap is formed of a material configured to diffuse the incident EO radiation within the material of the cap such that at least a portion of the incident EO radiation is diffused into the EO radiation receiving area.

2. The apparatus of claim 1, wherein the cap comprises an outer surface configured to diffuse the incident EO radiation within the material of the cap.

3. The apparatus of claim 1, wherein an external surface of the cap is configured to diffuse the incident EO radiation by use of one or more of dimples and indentations.

4. The apparatus of claim 1, wherein the cap further comprises a base.

5. The apparatus of claim 1, wherein the material of the cap defines the EO radiation receiving area.

6. The apparatus of claim 1, wherein the cap is configured to direct EO radiation emitted within the cap into the EO radiation receiving area.

7. The apparatus of claim 1, wherein the cap is configured to reflect EO radiation emitted within the cap into the EO radiation receiving area.

8. An electro-optical (EO) radiation collector, comprising:
a cap comprising an outer surface in exposure to incident EO radiation from outside an interior region of the cap;
a uniform material forming the cap that defines a receiving area within the interior region of the cap; and
a securing member configured to position an exposed section of an EO radiation conductor within the receiving area of the cap, the cap configured to enclose the exposed section of the EO radiation conductor, the securing member further configured to bend the EO radiation conductor within the cap such that a longitudinal axis of the exposed section positioned within the receiving area differs from a longitudinal axis of the EO radiation conductor at an entrance of the EO radiation conductor into the interior region of the cap;
wherein the uniform material forming the cap diffuses the incident EO radiation within the uniform material forming the cap such that at least a portion of the incident EO radiation is diffused into the receiving area.

9. The EO radiation collector of claim 8, wherein the uniform material forming the cap comprises an outer surface that diffuses at least a portion of the incident EO radiation external to the cap into the receiving area within the cap.

10. The EO radiation collector of claim 9, wherein the outer surface comprises one or more of dimples and indentations.

11. The EO radiation collector of claim 9, further comprising a base of the cap, wherein the exposed portion of the EO radiation conductor is enclosed within the cap and the base.

12. The EO radiation collector of claim 8, further comprising a reflective surface configured to direct EO radiation emitted within the cap into the EO radiation conductor.

13. A system, comprising:
an electro-optical (EO) radiation collector, comprising:
a body comprising a base and a cap, the cap having an inner EO receiving area, and
a securing mechanism configured to position an exposed portion of an EO radiation conductor enclosed within the body of the EO radiation within the inner EO receiving area of the cap, the securing mechanism configured to bend a section of the EO radiation conductor within the cap such that the exposed portion of the EO radiation conductor is at a bent configuration relative to a portion of the EO radiation conductor at which the EO radiation conductor enters the cap;
an outer surface of the cap, wherein the outer surface of the cap comprises an external surface of the EO radiation collector that is exposed to incident EO radiation external to the EO radiation collector,
wherein a material forming the cap is configured to diffuse the incident EO radiation within the material forming the cap such that at least a portion of the incident EO radiation is diffused into the inner EO receiving area, and
wherein the cap is configured to provide an optical path within the body to optically couple EO radiation emitted within the body to the exposed portion of the EO conductor.

14. The system of claim 13, wherein the cap comprises an outer surface that diffuses at least a portion of the incident EO radiation external to the EO radiation collector into the inner EO receiving area.

15. The system of claim 14, wherein the outer surface comprises dimples.

16. The system of claim 14, wherein the outer surface comprises indentations.

17. The system of claim 13, wherein the cap is comprised of a material configured to form the inner EO receiving area.

18. The system of claim 13, further comprising a self-test module to emit EO radiation into the cap of the EO radiation collector and to determine a result of a self-test operation based on EO radiation detected by the EO radiation sensor in response to the emitted EO radiation.

19. The system of claim 18, wherein the optical path comprises a reflective surface of the cap, the reflective surface configured to direct at least a portion of the EO radiation emitted within the body to the exposed portion of the EO radiation conductor.

* * * * *